(12) United States Patent
Kah et al.

(10) Patent No.: US 12,620,203 B2
(45) Date of Patent: May 5, 2026

(54) DATA COLLECTION AND CLASSIFIER TRAINING IN EDGE VIDEO DEVICES

(71) Applicant: Western Digital Technologies, Inc., San Jose, CA (US)

(72) Inventors: Damien Kah, San Jose, CA (US); Qian Zhong, Fremont, CA (US); Shaomin Xiong, Fremont, CA (US); Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 972 days.

(21) Appl. No.: 17/719,049

(22) Filed: Apr. 12, 2022

(65) Prior Publication Data

US 2023/0326183 A1 Oct. 12, 2023

(51) Int. Cl.
G06V 10/774 (2022.01)
G06N 3/08 (2023.01)
(Continued)

(52) U.S. Cl.
CPC ........ G06V 10/774 (2022.01); G06V 10/7715 (2022.01); G06V 10/776 (2022.01);
(Continued)

(58) Field of Classification Search
CPC ............. G06V 10/774; G06V 10/7715; G06V 10/776; G06V 10/778; G06V 20/46;
(Continued)

(56) References Cited

U.S. PATENT DOCUMENTS 8,385,632 B2    2/2013  Porikli
2016/0078359 A1  3/2016  Csurka et al.
(Continued)

FOREIGN PATENT DOCUMENTS

WO      2015192239 A1   12/2015

OTHER PUBLICATIONS

Brady et al.,("Deep learning for camera data acquisition, control, and image estimation" Published Nov. 24, 2020 By "Advances in Optics and Photonics" Total 60 Pages (Year: 2020).*
"Domain Adaptation and Retraining", Modzy, Nov. 20, 2020, https://www.modzy.com/blog/domain-adaptation-and-retraining/.
(Continued)

*Primary Examiner* — Quoc A Tran
(74) *Attorney, Agent, or Firm* — Patent Law Works LLP

(57) ABSTRACT

A digital video camera architecture for updating an object identification and tracking model deployed with the camera is disclosed. The invention comprises optics, a processor, a memory, and an artificial intelligence logic which may further comprise artificial neural networks. The architecture may identify objects according to the confidence threshold of a model. The confidence threshold may be monitored over time, and the model may be updated if the confidence threshold drops below an acceptable level. The data for retraining is ideally generated substantially internal to the camera. A classifier is generated to process the entire field data set stored on the camera to create a field data subset also stored on the camera. The field data subset may be run through the model to generate cases that may be used in further monitoring, training, and updating of the model. Classifiers may also be generated for images in different domains (e.g., lighting, weather, surveillance area, indoor, outdoor, urban, rural, etc.). These classifiers can be used to train the model to accurately identify objects and features independent of the domain of origin of the image being evaluated.

20 Claims, 20 Drawing Sheets

(51) Int. Cl.

| | |
|---|---|
| *G06V 10/44* | (2022.01) |
| *G06V 10/77* | (2022.01) |
| *G06V 10/776* | (2022.01) |
| *G06V 10/778* | (2022.01) |
| *G06V 10/82* | (2022.01) |
| *G06V 20/40* | (2022.01) |

(52) U.S. Cl.
CPC ............ *G06V 10/778* (2022.01); *G06V 20/46* (2022.01); *G06N 3/08* (2013.01); *G06T 2207/20084* (2013.01); *G06V 10/454* (2022.01); *G06V 10/82* (2022.01); *G06V 2201/07* (2022.01)

(58) Field of Classification Search
CPC .. G06V 2201/07; G06V 10/82; G06V 10/454; G06T 2207/20084; G06N 3/08
See application file for complete search history.

(56) References Cited

U.S. PATENT DOCUMENTS

| | | | |
|---|---|---|---|
| 2016/0253597 A1 | 9/2016 | Bhatt et al. | |
| 2017/0140253 A1 | 5/2017 | Wshah et al. | |
| 2021/0406560 A1* | 12/2021 | Park ...................... | G01S 13/867 |
| 2023/0119634 A1* | 4/2023 | Kabkab .............. | G06F 18/2431 |
| | | | 382/103 |

OTHER PUBLICATIONS

Patel, V. M., et al., "Visual Domain Adaptation: A Survey of Recent Advances", Oct. 1, 2014, <https://engineering.jhu.edu/vpatel36/wp-content/uploads/2018/08/SPM_DA_v9.pdf>.

IVmarcom, "Reducing False Alarms in Central Monitoring Stations", Mar. 22, 2019, https://www.intelli-vision.com/2019/03/22/reducing-false-alarms-in-central-monitoring-stations/.

"Industrial AI Camera, Vision Cam AI.go", screen capture Feb. 21, 2021, <https://imago-technologies.com/ai-camera/?gclid=EAlaIQobChMlqffD5bzE9AIVQZImAh1wVATKEAMYASAAEgJqcfD_BwE>.

Zhang C., et al., "Improving Domain-Adaptive Person Re-Identification by Dual-Alignment Learning With Camera-Aware Image Generation", IEEE Transactions on Circuits and Systems for VideoTechnology (vol. 31, Issue: 11, Nov. 2021), <https://ieeexplore.ieee.org/document/9306883>.

Wan, M. et al., "Deep Visual Domain Adaptation: A Survey", School of Information and Communication Engineering, Beijing University of Posts and Telecommunications, Apr. 25, 2018, <https://www.researchgate.net/publication/323142148_Deep_Visual_Domain_Adaptation_A_Survey>.

Bermudez, D.V., "Domain Adaptation of virtual and real world for pedestrian detection", Universitat Autonoma de Barcelona, Jun. 17, 2013, <https://www.tesisenred.net/bitstream/handle/10803/125977/dvb1de1.pdf?sequence=1&isAllowed=y>.

* cited by examiner

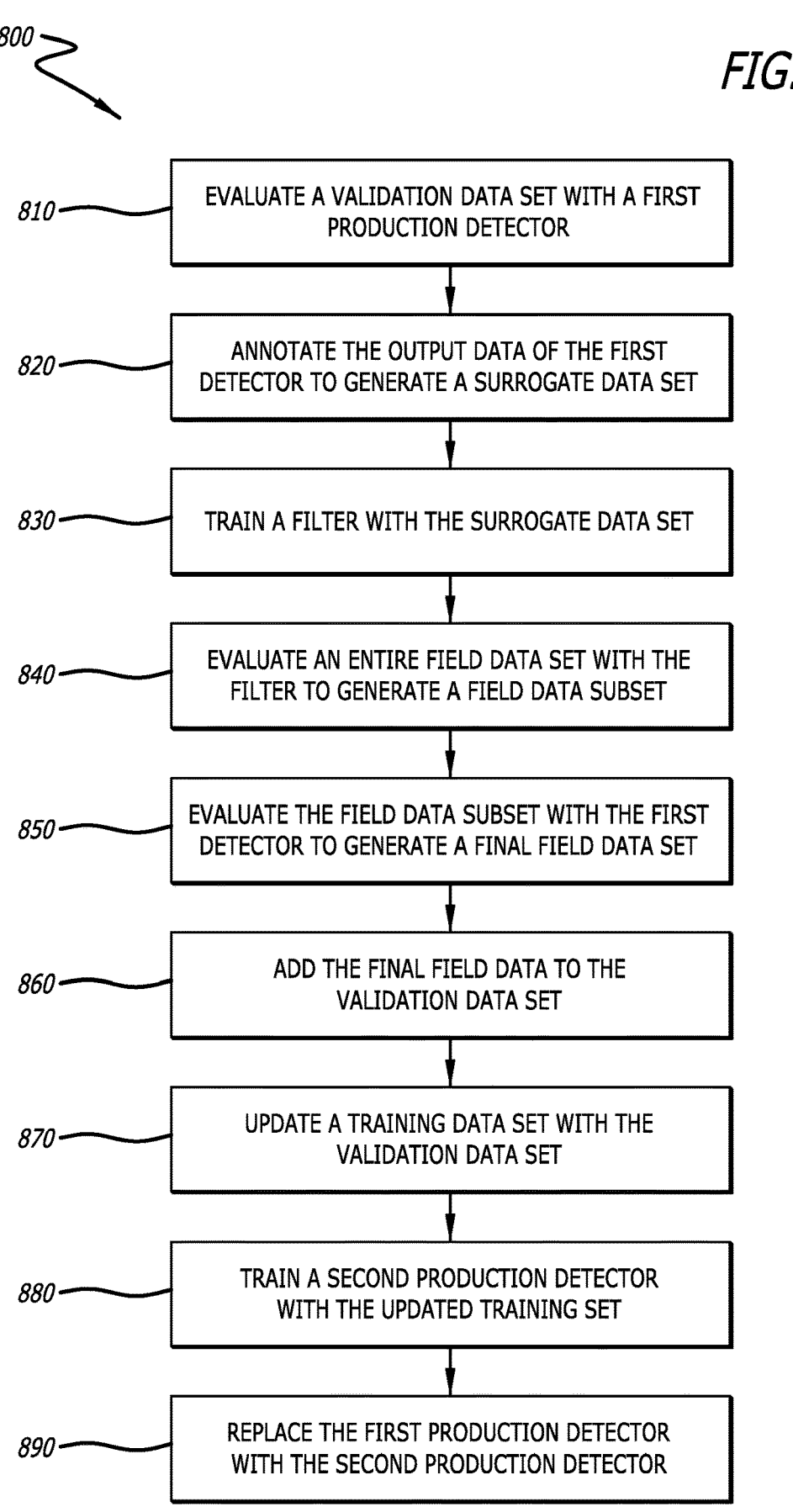

810 — EVALUATE A VALIDATION DATA SET WITH A FIRST PRODUCTION DETECTOR

820 — ANNOTATE THE OUTPUT DATA OF THE FIRST DETECTOR TO GENERATE A SURROGATE DATA SET

830 — TRAIN A FILTER WITH THE SURROGATE DATA SET

840 — EVALUATE AN ENTIRE FIELD DATA SET WITH THE FILTER TO GENERATE A FIELD DATA SUBSET

850 — EVALUATE THE FIELD DATA SUBSET WITH THE FIRST DETECTOR TO GENERATE A FINAL FIELD DATA SET

860 — ADD THE FINAL FIELD DATA TO THE VALIDATION DATA SET

870 — UPDATE A TRAINING DATA SET WITH THE VALIDATION DATA SET

880 — TRAIN A SECOND PRODUCTION DETECTOR WITH THE UPDATED TRAINING SET

890 — REPLACE THE FIRST PRODUCTION DETECTOR WITH THE SECOND PRODUCTION DETECTOR

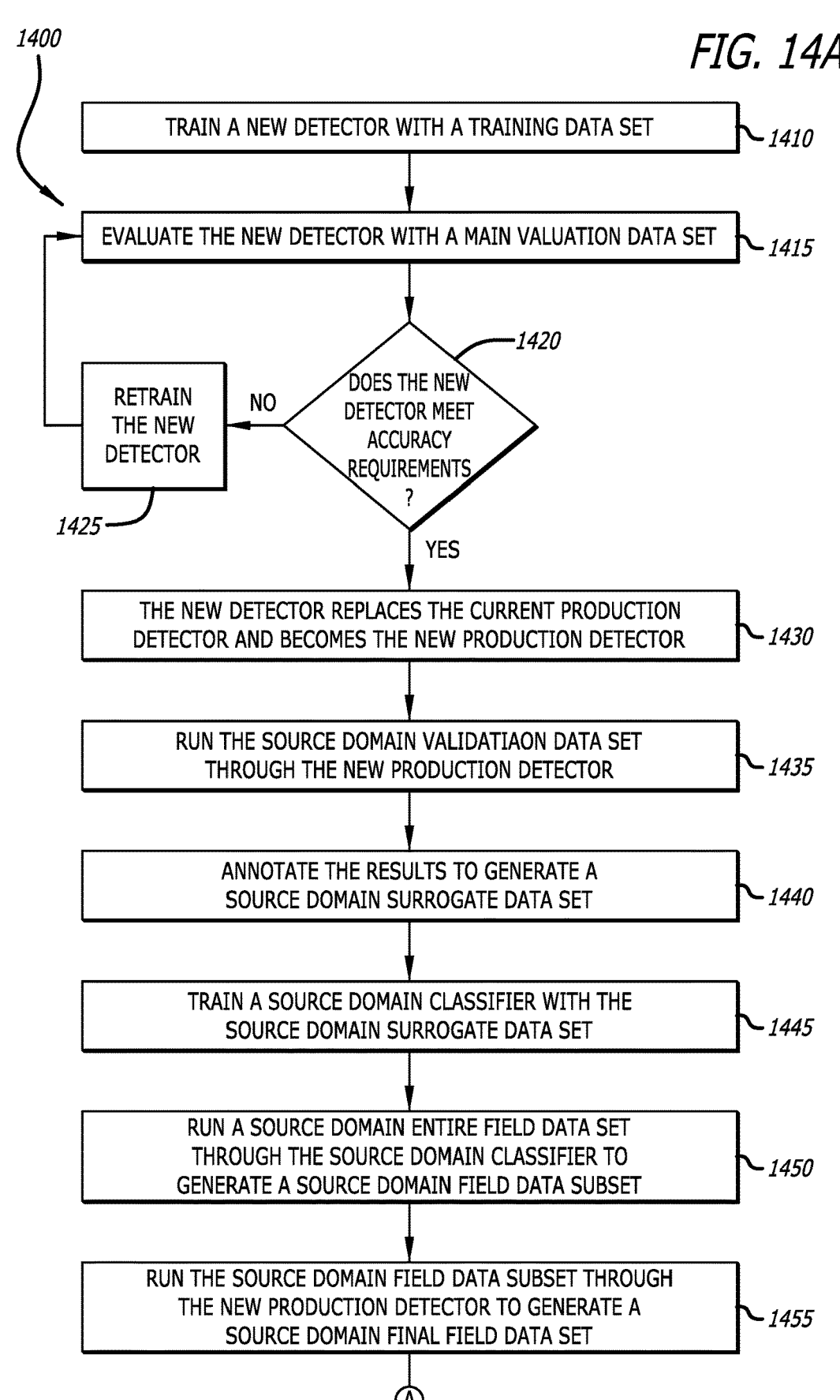

TRAIN A NEW DETECTOR WITH A TRAINING DATA SET — *1410*

EVALUATE THE NEW DETECTOR WITH A MAIN VALUATION DATA SET — *1415*

*1420*

DOES THE NEW DETECTOR MEET ACCURACY REQUIREMENTS ?

NO

RETRAIN THE NEW DETECTOR

*1425*

YES

THE NEW DETECTOR REPLACES THE CURRENT PRODUCTION DETECTOR AND BECOMES THE NEW PRODUCTION DETECTOR — *1430*

RUN THE SOURCE DOMAIN VALIDATIAON DATA SET THROUGH THE NEW PRODUCTION DETECTOR — *1435*

ANNOTATE THE RESULTS TO GENERATE A SOURCE DOMAIN SURROGATE DATA SET — *1440*

TRAIN A SOURCE DOMAIN CLASSIFIER WITH THE SOURCE DOMAIN SURROGATE DATA SET — *1445*

RUN A SOURCE DOMAIN ENTIRE FIELD DATA SET THROUGH THE SOURCE DOMAIN CLASSIFIER TO GENERATE A SOURCE DOMAIN FIELD DATA SUBSET — *1450*

RUN THE SOURCE DOMAIN FIELD DATA SUBSET THROUGH THE NEW PRODUCTION DETECTOR TO GENERATE A SOURCE DOMAIN FINAL FIELD DATA SET — *1455*

Ⓐ

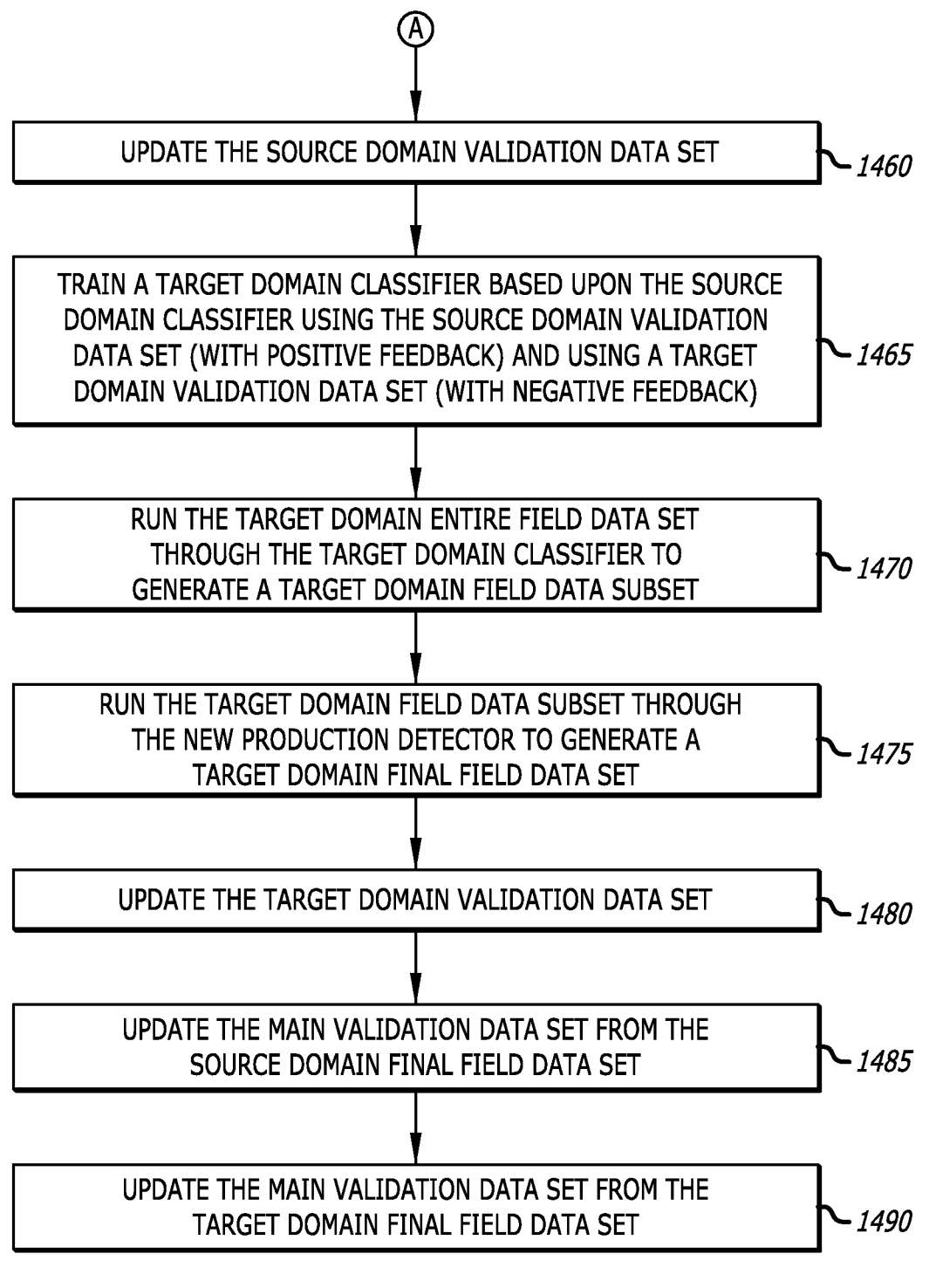

Ⓐ

UPDATE THE SOURCE DOMAIN VALIDATION DATA SET — *1460*

TRAIN A TARGET DOMAIN CLASSIFIER BASED UPON THE SOURCE DOMAIN CLASSIFIER USING THE SOURCE DOMAIN VALIDATION DATA SET (WITH POSITIVE FEEDBACK) AND USING A TARGET DOMAIN VALIDATION DATA SET (WITH NEGATIVE FEEDBACK) — *1465*

RUN THE TARGET DOMAIN ENTIRE FIELD DATA SET THROUGH THE TARGET DOMAIN CLASSIFIER TO GENERATE A TARGET DOMAIN FIELD DATA SUBSET — *1470*

RUN THE TARGET DOMAIN FIELD DATA SUBSET THROUGH THE NEW PRODUCTION DETECTOR TO GENERATE A TARGET DOMAIN FINAL FIELD DATA SET — *1475*

UPDATE THE TARGET DOMAIN VALIDATION DATA SET — *1480*

UPDATE THE MAIN VALIDATION DATA SET FROM THE SOURCE DOMAIN FINAL FIELD DATA SET — *1485*

UPDATE THE MAIN VALIDATION DATA SET FROM THE TARGET DOMAIN FINAL FIELD DATA SET — *1490*

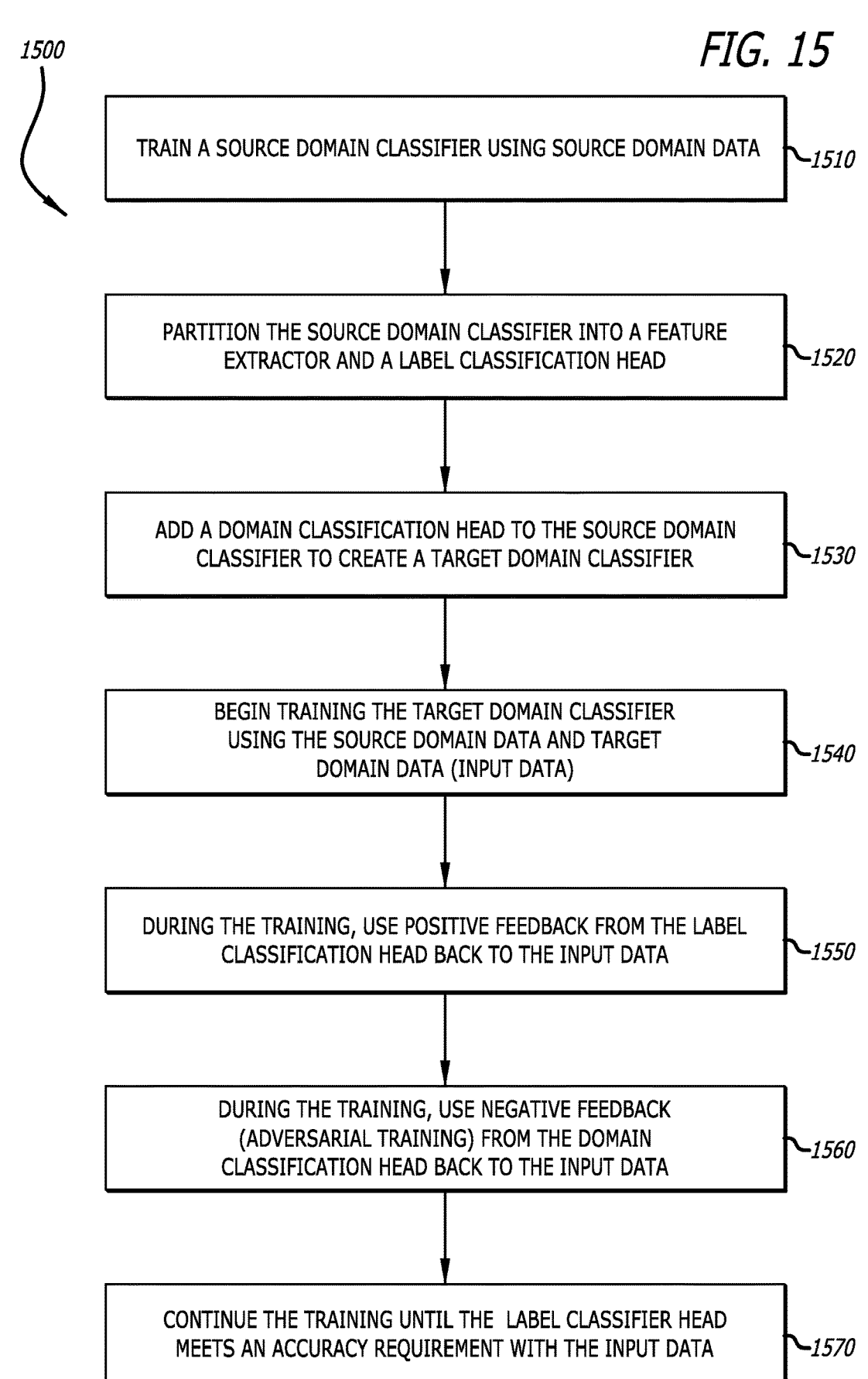

TRAIN A SOURCE DOMAIN CLASSIFIER USING SOURCE DOMAIN DATA ∽*1510*

PARTITION THE SOURCE DOMAIN CLASSIFIER INTO A FEATURE EXTRACTOR AND A LABEL CLASSIFICATION HEAD ∽*1520*

ADD A DOMAIN CLASSIFICATION HEAD TO THE SOURCE DOMAIN CLASSIFIER TO CREATE A TARGET DOMAIN CLASSIFIER ∽*1530*

BEGIN TRAINING THE TARGET DOMAIN CLASSIFIER USING THE SOURCE DOMAIN DATA AND TARGET DOMAIN DATA (INPUT DATA) ∽*1540*

DURING THE TRAINING, USE POSITIVE FEEDBACK FROM THE LABEL CLASSIFICATION HEAD BACK TO THE INPUT DATA ∽*1550*

DURING THE TRAINING, USE NEGATIVE FEEDBACK (ADVERSARIAL TRAINING) FROM THE DOMAIN CLASSIFICATION HEAD BACK TO THE INPUT DATA ∽*1560*

CONTINUE THE TRAINING UNTIL THE LABEL CLASSIFIER HEAD MEETS AN ACCURACY REQUIREMENT WITH THE INPUT DATA ∽*1570*

DATA COLLECTION AND CLASSIFIER TRAINING IN EDGE VIDEO DEVICES

RELATED APPLICATIONS

This application is related to application Ser. Nos. 17/515,977 and 17/516,188, both of which were filed Nov. 1, 2021 and owned by the same assigneee, and are incorporated herein by reference in its entirety.

FIELD

The present disclosure relates to image processing. More particularly, the present disclosure technically relates to efficient training and retraining of artificial neural networks in video data processing in edge video devices.

BACKGROUND

As technology has grown over the last decade, the quantity of time-series data such as video content has increased dramatically. This increase in time-series data has generated a greater demand for automatic object identification and classification. In response, neural networks and other artificial intelligence methods have been increasingly utilized to generate automatic classifications, specific detections, and segmentations. In the case of video processing, computer vision trends have progressively focused on object detection, image classification, and other segmentation tasks to parse semantic meaning from video content. In particular, there is a need to improve the models used for object detection. It is desirable for this process to be automated as much as possible and to be as independent of capture conditions as possible.

BRIEF DESCRIPTION OF DRAWINGS

The above and other aspects, features, and advantages of several embodiments of the present disclosure will be more apparent from the following description as presented in conjunction with the following several figures of the drawings.

FIG. 8 is a flowchart of a process for collecting data and retraining a model in accordance with an embodiment of the disclosure;

FIG. 11 is a conceptual diagram of the latent space encoding of two sorts of auto-encoders in accordance with an embodiment of the disclosure;

FIG. 14A is a first portion of a flowchart of a process for training a classifier in accordance with an embodiment of the disclosure;

FIG. 14B is a second portion of a flowchart of a process for training a classifier in accordance with an embodiment of the disclosure; and FIG. 15 is a flowchart of a process for training a classifier in accordance with an embodiment of the disclosure.

Figure 1:
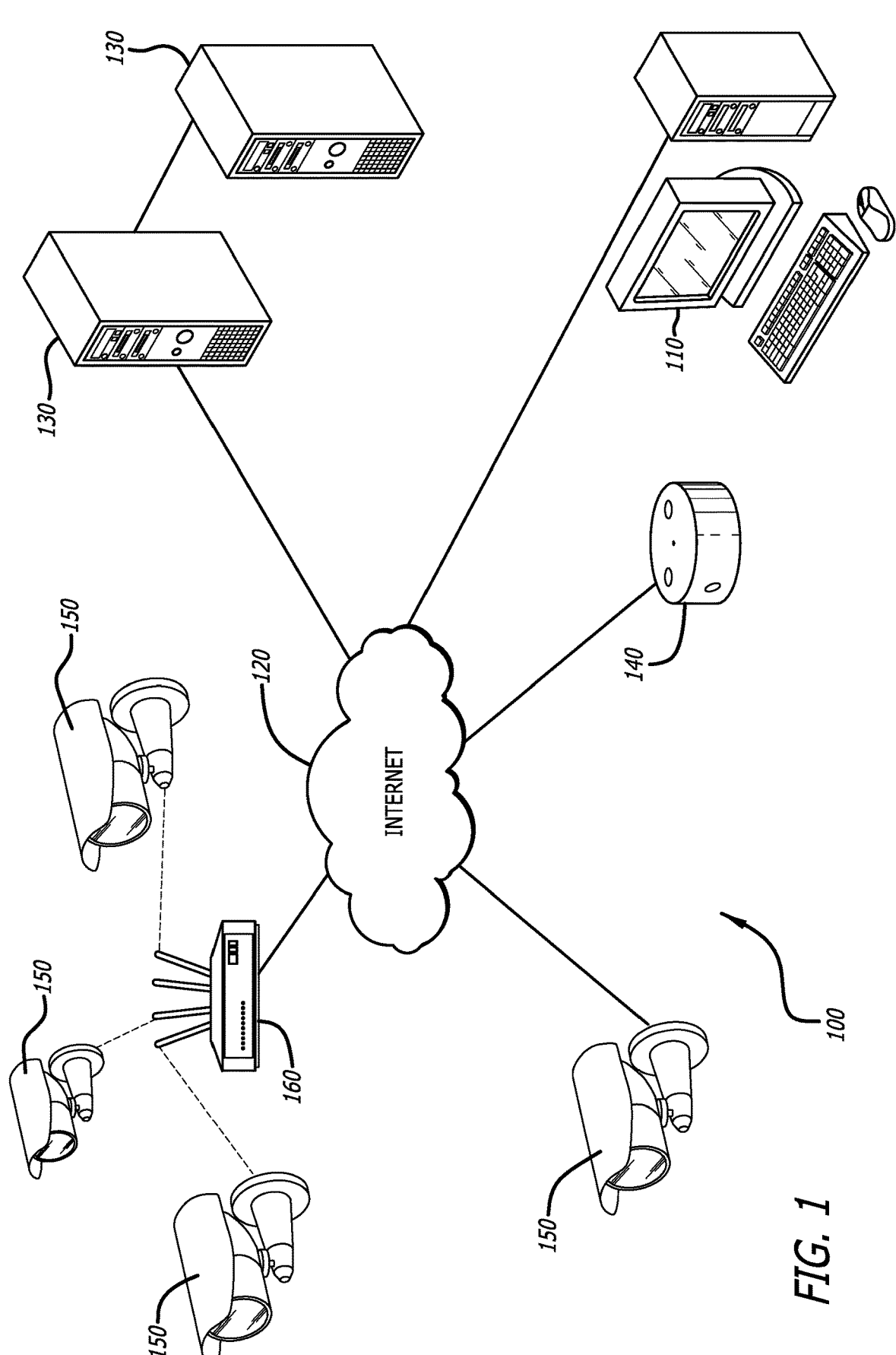
FIG. 1 is a conceptual illustration of a video image data processing system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the issues described above, systems and methods are discussed herein that describe processes for streamlining the process of updating the models for video image data processing within artificial neural networks and other Artificial Intelligence (AI) techniques. Specifically, systems and methods are presented for the improvement of the models employed by digital video cameras with a minimum of human intervention.

In particular, it may be desirable to increase the certainty with which models detect objects and track their motions. A confidence threshold may be used in the models to differentiate between True Positive (TP) detections (e.g., correct detection of an object), False Positive (FP) detections (e.g., incorrect detections of an object), True Negative (TN) detections (e.g., correct detections of the absence of an object), and False Negative (FN) detections (e.g., incorrect detection of an object that is not present, or missing an object that is present). Collecting examples of FP and FN cases may be used to periodically train and update the model In practical applications, digital video cameras may be installed in clusters for purposes of surveillance of an area or areas. A single customer may have multiple installations, and additional customers may increase the installed base even further. The digital video cameras may be coupled to one or more computers which may be (optionally) operated by either the camera owner(s), the camera manufacturer, and/or a service provider. The amount of stored data may be immense, with hundreds of hours of video stored in thousands of cameras in dozens or hundreds of installations worldwide.

In all of that data, there may be mistakes where the model made an FP or FN identification. Further, the accuracy of a model may decay over time due to changes in different factors, such as time of day, weekday, weather, occlusions in the video field of a camera, etc. This may cause some frames seen by the camera while deployed to have images that do not resemble any image from the training data set. These unseen images and their situation (or context) may be responsible for the accuracy decay. It may be desirable to identify some of these cases to improve the training data used to create the models. Given the volume of data, automation may be necessary to find those errant cases, select some for either human annotation (e.g., a human or user making a judgment if the FP or FN candidate is really incorrect) or computer annotation (e.g., a cloud or server-based AI processing making that judgment). Some of the data collection and retraining may be performed internal to the digital video camera. This may eliminate the need for shipping large quantities of video data to computers or servers for processing, saving both computational and bandwidth resources.

Embodiments of the present disclosure can be utilized in a variety of fields, including general video analytics, facial recognition, object segmentation, object recognition, autonomous driving, traffic flow detection, drone navigation/operation, stock counting, inventory control, and other automation-based tasks that generate time-series based data. The use of these embodiments can result in fewer required computational resources to produce similarly accurate results compared to a traditional convolutional or other neural network. In this way, more deployment options may become available as computational resources increase and become more readily available on smaller and less expensive electronic devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions in order to emphasize their implementation independence more particularly. For example, a function may be implemented as a hardware circuit comprising custom VLSI circuits or gate arrays, off-the-shelf semiconductors such as logic chips, transistors, field-programmable gate arrays ("FPGAs"), or other discrete components. A function may also be implemented in programmable hardware devices such as programmable array logic, programmable logic devices, or the like.

"Neural network" refers to any logic, circuitry, component, chip, die, package, module, system, sub-system, or computing system configured to perform tasks by imitating biological neural networks of people or animals. Neural network, as used herein, may also be referred to as an artificial or deep neural network (DNN). Examples of neural networks that may be used with various embodiments of the disclosed solution include, but are not limited to, convolutional neural networks, feed-forward neural networks, radial basis neural networks, recurrent neural networks, modular neural networks, and the like. Certain neural networks may be designed for specific tasks such as object detection and/or image classification. Examples of neural networks suitable for object detection include, but are not limited to, Region-based Convolutional Neural Network (RCNN), Faster Region-based Convolutional Neural Network (Faster R-CNN), You Only Look Once (YOLO), and the like. Examples of neural networks suitable for image classification may include but are not limited to Googlenet Inception, Resnet, Mobilenet, Densenet, and Efficientnet. A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like. The neural network used with embodiments disclosed herein may employ one or more of a variety of learning models, including, but not limited to, supervised learning, unsupervised learning, and reinforcement learning. These learning models may employ various backpropagation techniques.

Functions or other computer-based instructions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations, which, when joined logically together, comprise the function and achieve the stated purpose for the function.

Indeed, a function of executable code may include a single instruction or many instructions and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices in electrical communication with one or more other components through electrical lines of a printed circuit board (PCB) or the like. Each of the functions, logics, and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current so that the circuit is a closed-loop. In another embodiment, however, a set of components that does not include a return pathway for electrical current may be referred to as a circuit (e.g., an open-loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In some embodiments, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices in electrical communication with one or more other components through electrical lines of a printed circuit board (PCB) or the like. Each of the functions, logics, and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a video image data processing computational system 100 in accordance with an embodiment of the disclosure is shown. In many embodiments, it may be desired to monitor one or more visual areas by installing security cameras 150 within those areas. The security cameras 150 can generate a plurality of video image data (i.e., "video content") that can be processed. In a number of embodiments, the processing of the video image data will be configured to determine if one or more specific objects are within the monitored visual areas. In a number of embodiments, this detection may be presented as an inference map image from an object detection neural network which can be a segmentation or panoptic map. These maps can be utilized as a classification as to whether a specific object is present within the input data or not. These maps can be generated as an output from a neural network such as, but not limited to, a convolutional neural network (CNN). By way of example, and not limitation, video image data processing can be established to detect the presence of one or more pedestrians within the monitored visual areas. It will be understood by those skilled in the art that the video image data processing may be performed by processors internal to security cameras 150 or elsewhere in the computational system or in some combination thereof. The video image data processing may be implemented in software operating in conventional processors (e.g., CPU, MPU, GPU, RISC, etc.) and/or software operating in specifically purposed processors optimized to implement neural networks—or some combination thereof. In fact, the entire system may be considered a processor or a distributed processor.

Monitoring video content can be inefficient when done manually. Therefore, various embodiments attempt to minimize the amount of video content that needs to be manually reviewed by attempting to identify and/or determine if one or more specific objects are within the video content and then trigger a notification for manual review. Often, the video image data processing computational system 100 will process the video image data within a centralized video processing server 110, although some embodiments may offload various processing tasks to other devices such as, but not limited to edge network devices 140 (like, for example, server farms, specialized AI hardware accelerators, online databases, etc.), servers 130, or internal to the security cameras 150 (themselves edge network devices). The video processing server 110 is often connected to a network 120 such as the Internet, as depicted in FIG. 1. A plurality of security cameras 150 can also be attached to the network 120 such that they are communicatively coupled to the video processing server 110 comprising one or more processors like, for example, CPUs, MPUs, GPUs, etc. Although the embodiment of FIG. 1 depicts security cameras 150, it will be understood by those skilled in the art that any video image data capture device may be utilized as required by the desired application.

The security cameras 150 can be wired directly to the network 120 or may be wirelessly connected via one or more wireless access points 160. In this way, a variety of potential deployment arrangements may be realized to properly cover the desired areas for surveillance. In theory, there is no limit to the number of deployed security cameras 150 or other video image data capture devices that may be communicatively coupled with the video processing server 110. The limitations experienced may relate to the available bandwidth of the network 120 and the computational resources of the video processing server 110. As discussed below, superior performance for the video image data processing computational system 100 is for the bulk of the processing to be done locally by digital video cameras, such as security cameras 150 or other edge network devices 140 to minimize network traffic and reduce the need for centralized computing resources like video processing server 110 and servers 130.

Figure 2:
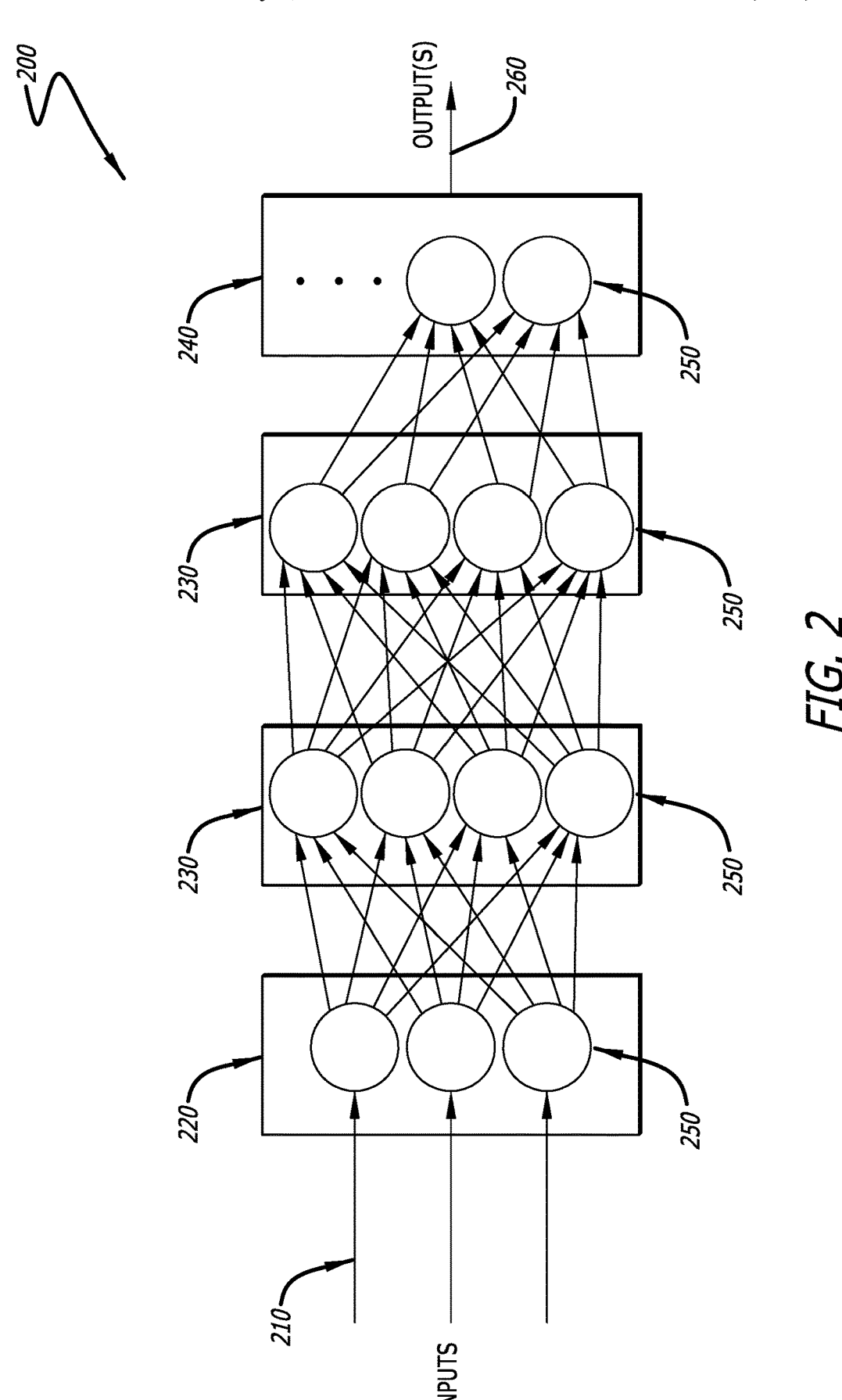
FIG. 2 is a conceptual illustration of an artificial neural network in accordance with an embodiment of the disclosure.

Referring to FIG. 2, a conceptual illustration of an artificial neural network 200 in accordance with an embodiment of the disclosure is shown. At a high level, the artificial neural network 200 comprises a number of inputs 210, an input layer 220, one or more intermediate layers 230, and an output layer 240. The artificial neural network 200 comprises a collection of connected units or nodes called artificial neurons 250, which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 200 depicted in FIG. 2 is shown as an illustrative example, and various embodiments may comprise artificial neural networks that can accept more than one type of input and can provide more than one type of output.

In a typical embodiment, the signal at a connection between artificial neurons is a real number, and the output of each artificial neuron is computed by some nonlinear function (called an activation function) of the sum of the artificial neuron's inputs. The connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 220) to the last layer (the output layer 240), possibly after traversing one or more intermediate layers (also called hidden layers) 230.

The inputs to an artificial neural network may vary depending on the problem being addressed. In object detection, the inputs may be data representing pixel values for certain pixels within an image or frame. In one embodiment, the artificial neural network 200 comprises a series of hidden layers in which each neuron is fully connected to neurons of the next layer. The artificial neural network 200 may utilize an activation function such as sigmoid, nonlinear, or a rectified linear unit (ReLU), upon the sum of the weighted inputs, for example. The last layer in the artificial neural network may implement a regression function such as SoftMax regression to produce the classified or predicted classifications output for object detection as output 260. In further embodiments, a sigmoid function can be used, and position prediction may need raw output transformation into linear and/or nonlinear coordinates.

In certain embodiments, the artificial neural network 200 is trained prior to deployment and to conserve operational resources. However, some embodiments may utilize ongoing training of the artificial neural network 200, especially when operational resource constraints such as die area and performance are less critical.

Figure 3:
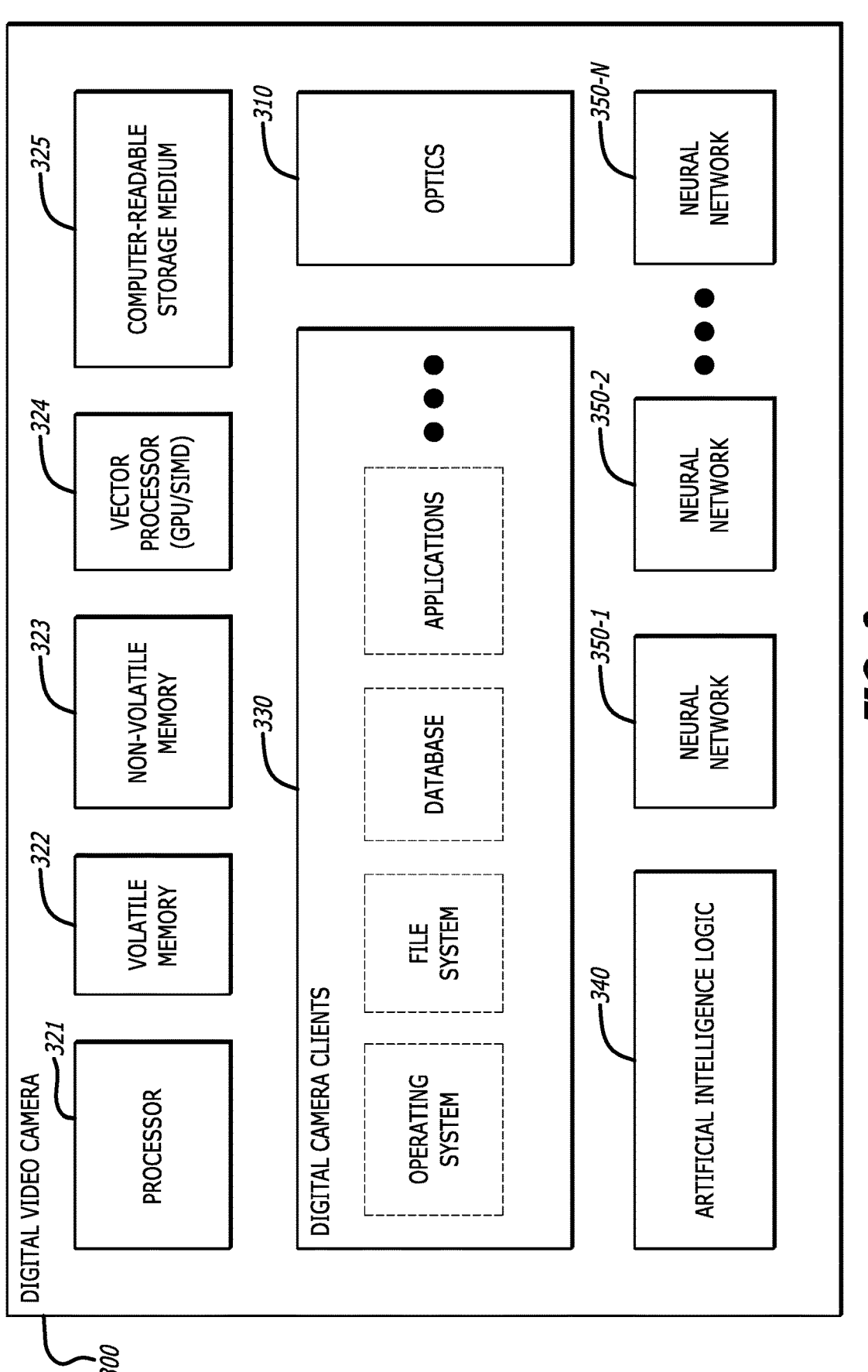
FIG. 3 is a schematic block diagram of a digital video camera in accordance with an embodiment of the disclosure.

Referring to FIG. 3, a schematic block diagram of a digital video camera in accordance with an embodiment of the disclosure is shown. Digital video camera 300 may comprise optics module 310, which may further comprise the lenses (not shown), the charge coupled devices (CCD), or other devices used to capture images (not shown), and the support circuitry (not shown) necessary for capturing successive frames of video data. Processor 321 may execute various control programs and applications such as digital camera clients 330. Such programs and applications may include an operating system, a file system, one or more databases, and a variety of applications, some of which may be artificial intelligence applications.

Volatile memory 322 may be used by processor 321 for code execution, scratch pad memory, temporary storage of video data, and the like. Non-volatile memory 323 may be used by processor 321 to store the programs, data, and various digital camera clients 330. It may also be used as mass storage for the video data captured by optics module 310. Optional vector processor 324 may be used for high-speed parallel calculations. In some embodiments, vector processor 324 may be implemented as part of the artificial intelligence logic 340. Vector processor 324 may be a graphics processing unit (GPU) and/or have a single instruction/multiple data (SIMD) processor architecture and be capable of operating on very long data words like, for example, 128-bits, 256-bits, 512-bits, 1024-bits, or even more in some embodiments. Computer-readable storage medium 325 may be used by processor 321 for program storage, data, and other purposes.

Artificial intelligence logic 340 may be either a hardware function, a software function, or a combination thereof. It may be responsible for managing all artificial intelligence (AI) functions, controlling the artificial neural networks 350-1, 350-2 through 350-N and using them for various functions, image processing functions, updating the AI modeling, and the like. Artificial neural networks 350-1, 350-2 through 350-N may be neural networks of the sort described in conjunction with FIG. 2 above and may be implemented in both hardware and/or software and/or a combination of hardware and software.

Figure 4:
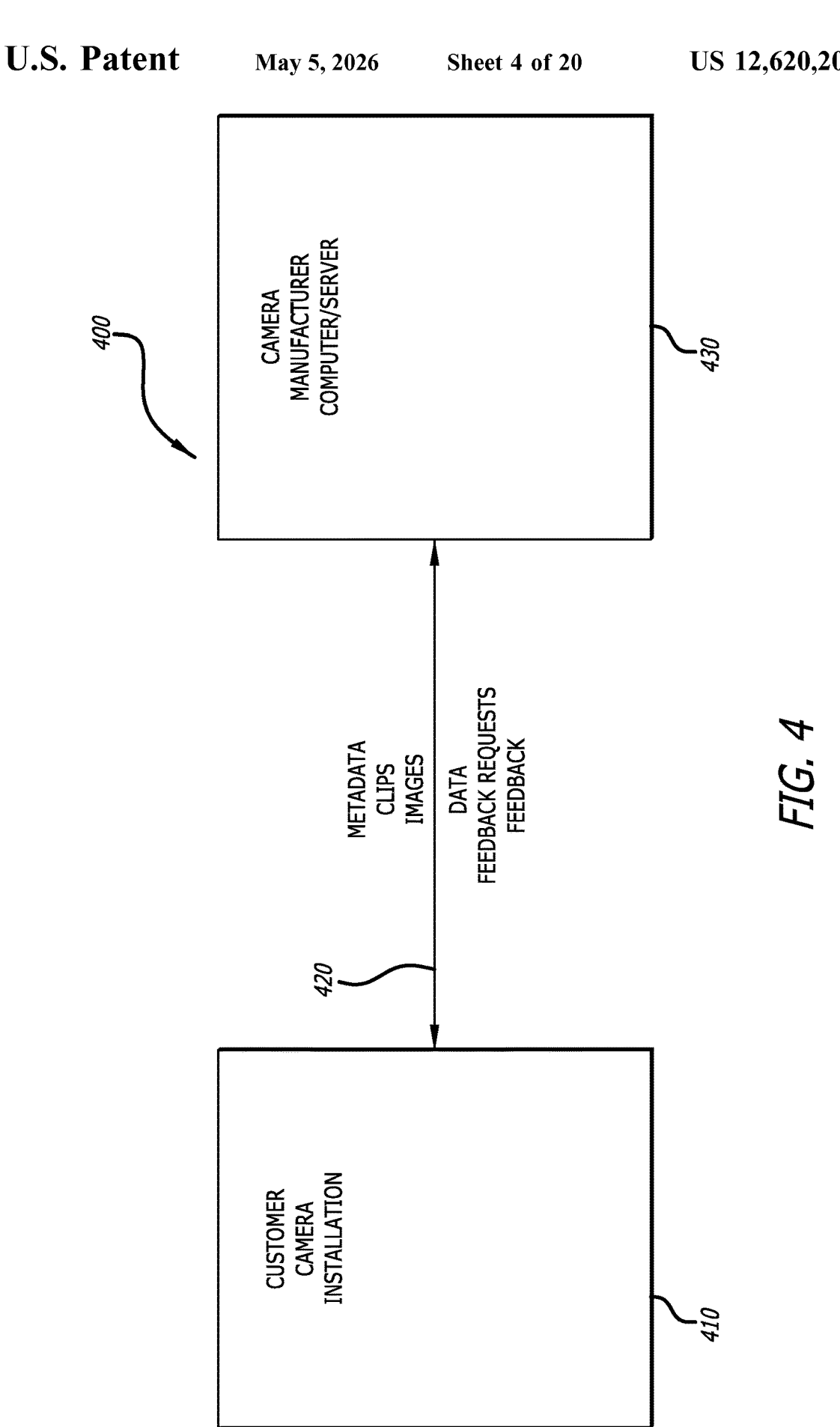
FIG. 4 is a schematic block diagram of a video processing and storage system in accordance with an embodiment of the disclosure.

Referring to FIG. 4, a schematic block diagram of a video processing and storage system 400 in accordance with an embodiment of the disclosure is shown. A customer camera installation 410 may comprise all of a customer's cameras. They may be coupled directly to a network 420 such as the Internet, or the cameras may be indirectly coupled to network 420 through a computer, a gateway, a server, or the like (not shown).

In some embodiments, the manufacturer of the cameras may also have one or more computers or servers 430 coupled to network 420. This is typically to enhance the customer's user experience with the camera installation by performing various tasks in the background with the customer's permission. Such tasks may include, for example, monitoring the functionality of the various cameras and creating service alerts or performing remote repairs, automatic updates to the camera software or firmware, assisting the customer with various aspects of managing their installed system, etc. In other embodiments, computers/servers 430 could represent the servers/computers of a service provider who receives data from the cameras and provides various services on the data, including analytics and processing. In some instances, the service provider may not be the manufacturer of the cameras.

In particular, the cameras may be deployed with a particular AI model in the software and/or firmware and/or hardware configured, for example, to identify objects (cars, people, packages, etc.), track their motion, identify characteristics of the object (gender, size, color, etc., depending on the identified object), and the like. The model may be trained at the factory, deployed with the camera, and updated periodically during the lifetime of the camera. The model may consist of the coefficients and the architecture for an artificial neural network like, for example, the one illustrated in FIG. 2. The architecture refers to the ground design choices such as the number of layers, the width of each layer, type of layers (Fully Connected, Convolutional, etc.), type of activation functions, etc. These may be determined by running a training data set of annotated examples through a neural network that has been correctly annotated. The neural network may compare the known correct result to the model output and "learns" by adjusting the coefficients to improve the accuracy of its outputs in a process commonly known as "machine learning."

Over time, the quality of the model outputs may degrade. This may occur for a variety of reasons, including, but not limited to, changes in traffic patterns, changes in the visual fields of the cameras, changes in time of day, changes in the day of the week, changes in the seasons, etc. These create image conditions that are not accounted for in the training dataset. This can refer to image capture (unseen light or weather condition), image context (significant background elements have changed due to human intervention or landscape change due to changes of seasons), or image content (object occlusion or size, object relation not captured in the training dataset, [i.e., hat detector only trained on images with a human wearing a hat cannot recognize a standalone hat]), etc. To keep the accuracy of the model's outputs high, periodic retraining may be needed. It may be desirable to include new annotated examples from a wide distribution of cameras surveilling a large variety of visual fields and target objects and/or characteristics to the training data set. This may be done by utilizing real annotated examples from the video logs of the cameras deployed in the field. However, this may involve thousands of cameras in dozens or even hundreds of installations, with each camera storing hundreds of hours of video. Since human annotation may be needed for the annotated examples in the annotated training set, it may be difficult and/or impossible for humans to manually review all of that data, looking for appropriate annotated examples to annotate. The process may be simplified by limiting the annotated examples to cases that the model has had difficulties in making correct identifications. This may reduce the number of potential candidates for new annotated examples.

Figure 5:
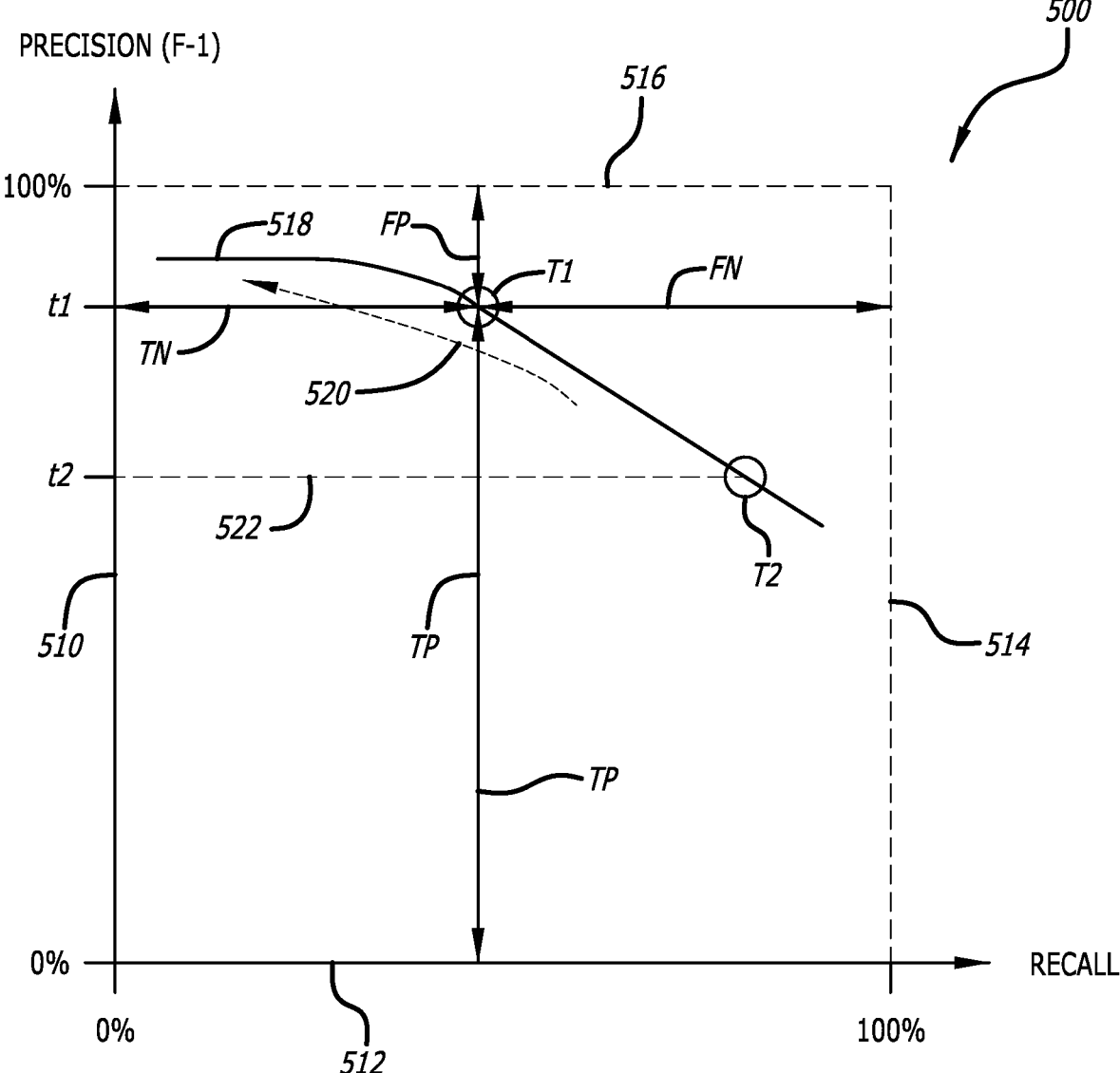
FIG. 5 is a graph of a Precision and Recall (PR) curve in accordance with an embodiment of the disclosure.

Referring to FIG. 5, a graph of a Precision/Recall (PR) curve in accordance with an embodiment of the disclosure is shown. Graph 500 comprises a vertical Precision-axis 510 and a horizontal Recall-axis 512. Both axes range from 0% to 100%. The dashed lines 514 and 516, along with the axes 510 and 512, form an extent box for the PR curve 518. In general, Precision may be a measure of the accuracy of a model's predictions, while Recall may be a measure of its sensitivity. A measure of model accuracy called the F-1 score is defined as the harmonic mean of the Precision and Recall scores for any point on the PR curve 518. The model may return a confidence score for any particular prediction of an image or object. There may be a relationship between the confidence threshold set by the manufacturer and the Precision, in that the higher the threshold, the higher the Precision obtained by the model as indicated by the curved dashed arrow 520.

Also shown in FIG. 5 is confidence threshold point T1 (at the center of the labeled circle) on the PR curve 518. This value may be chosen by the camera manufacturer. The solid arrow TP represents the percentage of true positives (e.g., identification of a present object) for the model, while the solid arrow FP represents the percentage of false positives (e.g., identification of an object where no object is present). Similarly, the solid arrow TN represents the percentage of true negatives (e.g., identification of the absence of an object where no object is present) for the model, while the solid arrow FN represents the percentage of false negatives (e.g., identification of the absence of an object where an object is present). As the PR curve 518 moves to the left, the number of FPs decreases while the number of false negatives FN increases. Thus, there may be a tradeoff to be made in choosing the right location for T1.

An object detection model may output such values as a class (person, animal, car, etc.), a bounding box (the location and extents of the object in a frame), and a confidence score (typically a percentage or decimal equivalent). The point T1 may correspond to the Precision and Recall for a certain confidence threshold set by the manufacturer. T1 may correspond to the minimum acceptable value of T1 after initial training or retraining of the model. The solid arrow TN inticates the precision value t1 for point T1 on vertical axis 510. Over time, the confidence level in the outputs of the AI model may degrade due to changes in the visual field of the camera or changes in the camera owner's desired use of the camera or the like. The confidence threshold point T2 (at the center of the labeled circle) may correspond to the Precision and Recall values where remedial action may be taken. The dashed arrow 522 indicates the precision value t2 for point T2 on vertical axis 510.

Figure 6:
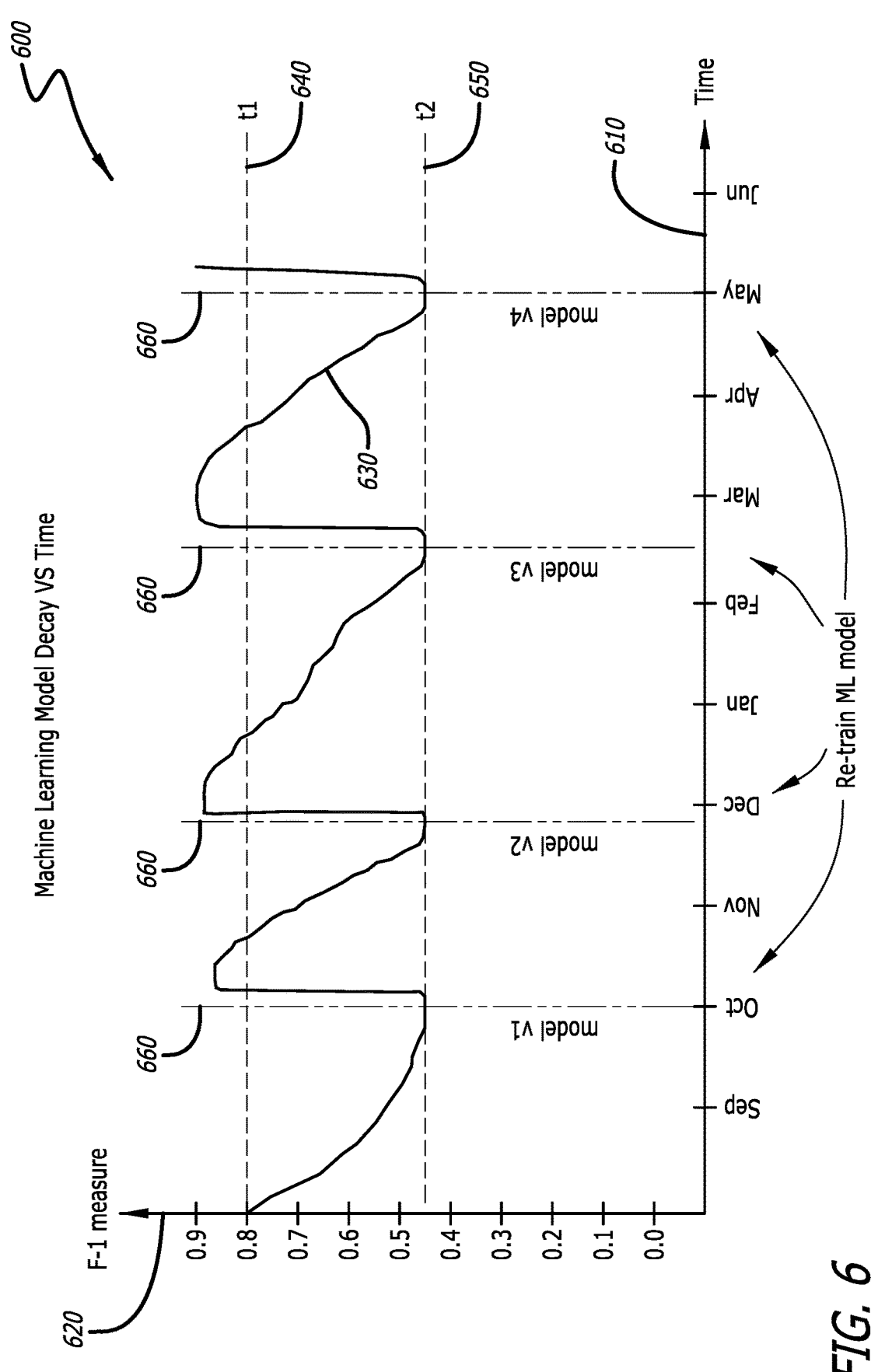
FIG. 6 is a graph of machine learning model decay in accordance with an embodiment of the disclosure.

Referring to FIG. 6, a graph of machine learning model decay 600 in accordance with an embodiment of the disclosure is shown. In the picture, the horizontal time axis 610 and the F-1 measure axis 620 are shown. The F-1 measure is the harmonic mean of the Precision and Recall. The scale is from 0.0 (0%) to 1.0 (100%). Data curve 630 may show the value of F-1, while dashed line 640 may show the chosen value of T1, and dashed line 650 may show the chosen value of T2. Over time, the value of the F-1 curve 630 may vary, where the confidence model may decay until it reaches the T2 level. This may be followed by a retraining period to generate an updated model where the value of the F-1 curve 630 may be increased to at least the value of T1. The new model may be deployed to the camera or cameras at the various times indicated by dashed lines 660. Persons skilled in the art will realize that the exact values of T1 and T2 shown are a matter of design choice and may vary substantially from model to model or version to version. Similarly, such skilled persons will realize that the time scale on axis 610 may also vary, and the time between retraining cycles may also vary substantially.

Figure 7A:
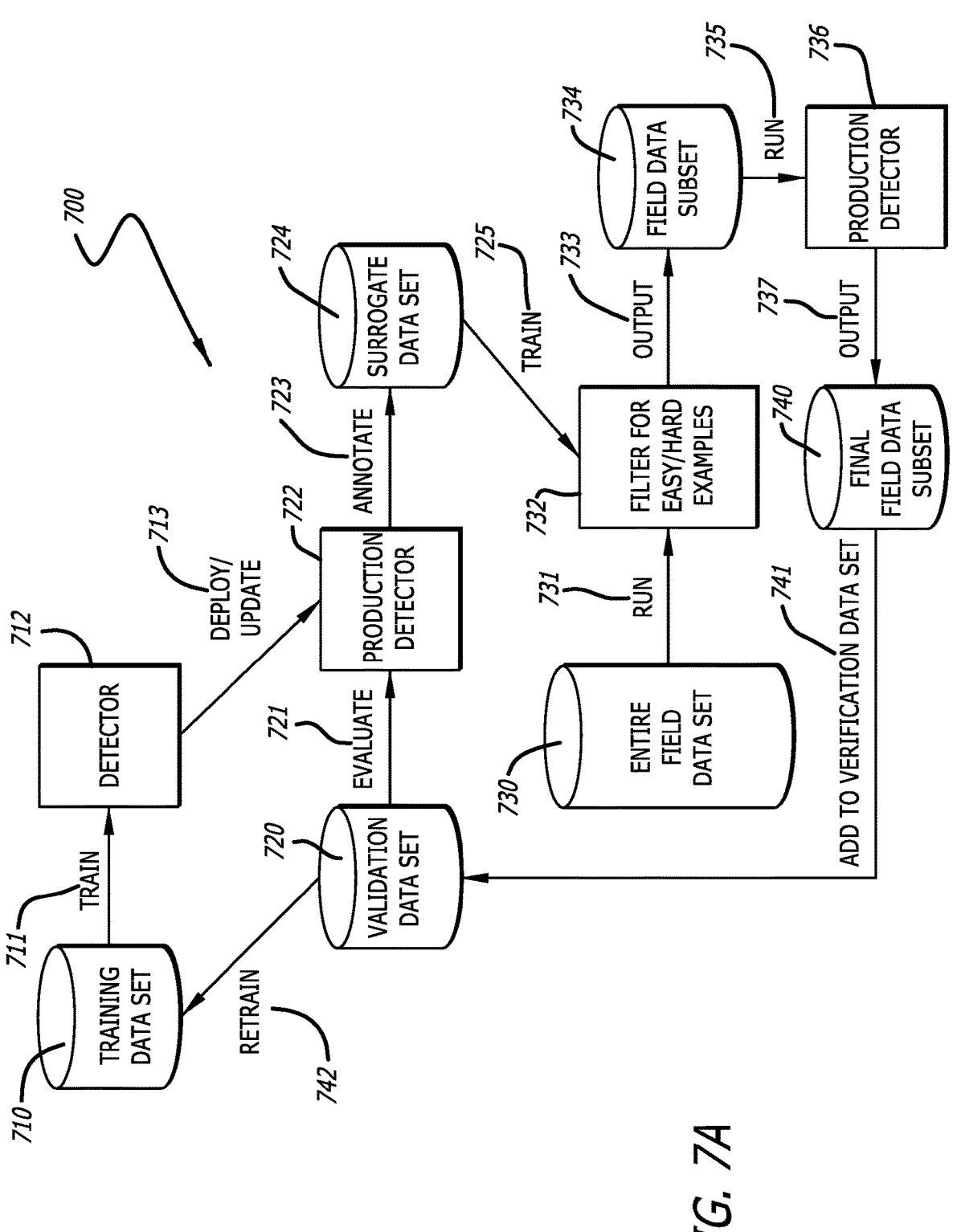
FIG. 7A is a conceptual diagram of a video processing and storage system in accordance with an embodiment of the disclosure.

Referring to FIG. 7A, a conceptual diagram of a video processing and storage system in accordance with an embodiment of the disclosure is shown. In computational system 700, a training data set 710 may be used to train (arrow 711) a detector model 712, which may use a conventional machine learning process to generate an AI model. In some embodiments, this may be done on the camera manufacturer's computers or servers with the same model being distributed to all cameras, while in other embodiments, it may be done in the camera itself and may be unique to that camera. In the first iteration of training (arrow 711) detector model 712, the training data set 710 may have no field data present. The initial training data set 710 may have synthetic data obtained from one or more sources like, for example, data developed internally by the camera manufacturer, data purchased from a third party, open-source data, some combination thereof, etc. After initial deployment (arrow 713), computational system 700 will add additional field data to training data set 710 as described below. Once the detector model 712 is deployed (arrow 713) to the cameras via the Internet or by other means, it becomes the current production detector 722.

The confidence factor F-1 decay over time means that production detector 722 may be monitored, and its outputs may be evaluated periodically. A validation data set 720 may be used to monitor and evaluate (arrow 721) production detector 722. Initially, like training data set 710, there is no field data in validation data set 720. Eventually, computational system 700 will add additional field data to validation data set 720 as described below. The output of production detector 722 will be annotated (arrow 723) to create surrogate data set 724. Surrogate data set 724 may have the same frames as in validation data set 720 but with different labels from the annotation process (arrow 723). In certain embodiments, the annotation process (arrow 723) may be done manually. This may involve a human visually looking at individual frames and correctly labeling true and false positives and true and false negatives. In alternative embodiments, the labeling may be done by a computationally intensive AI run external to the camera, like, for example, in servers operated by the camera manufacturer or by another service provider, out on the web, in the cloud, etc. There is no theoretical reason why the annotation (arrow 723) using an AI cannot be done internally to the camera if sufficient computing and memory resources are available.

The surrogate data set 724 with the new labels may be used to train (arrow 725) a filter 732. The annotations in surrogate data set 724 may customize the filter 732 to specifically separate easy from hard examples. When the training (arrow 725) is complete, the entire field data set 730 may be run (arrow 731) through filter 732, whose output (arrow 733) may, in turn, be used to generate field data subset 734. The entire field data set 730 may be the entire video data archived in all instances of the camera in service. Each camera may run (arrow 731) its own local video archive through its copy of filter 732, and its output (arrow 733) may be used to produce its own portion of field data subset 734. This may produce a substantially reduced field data subset 734 relative to entire field data set 730.

Field data subset 734 may be run (arrow 735) through production detector 736 (which may be the same model as production detector 722). The output (arrow 737) of production detector 736 may be used to generate final field data subset 740, which may comprise high-quality training examples. These examples may be added (arrow 741) to the validation data set 720. This may allow more effective evaluation (arrow 721) of the quality of production detector 722.

If the confidence factor F-1 reaches the T2 level, retraining (arrow 742) may be needed. The retraining (arrow 742) may use field-generated data from the validation data set 720 to update training data set 710. After the update, training data set 710 may be used to train (arrow 711) in a conventional manner. When the training is complete, the new detector model 712 is used to update (arrow 713) production detector 722. In some embodiments, production detector 722 may be deployed (arrow 713) to all of the cameras in the field, while in certain embodiments, only a subset of the deployed cameras may be updated.

Figure 7B:
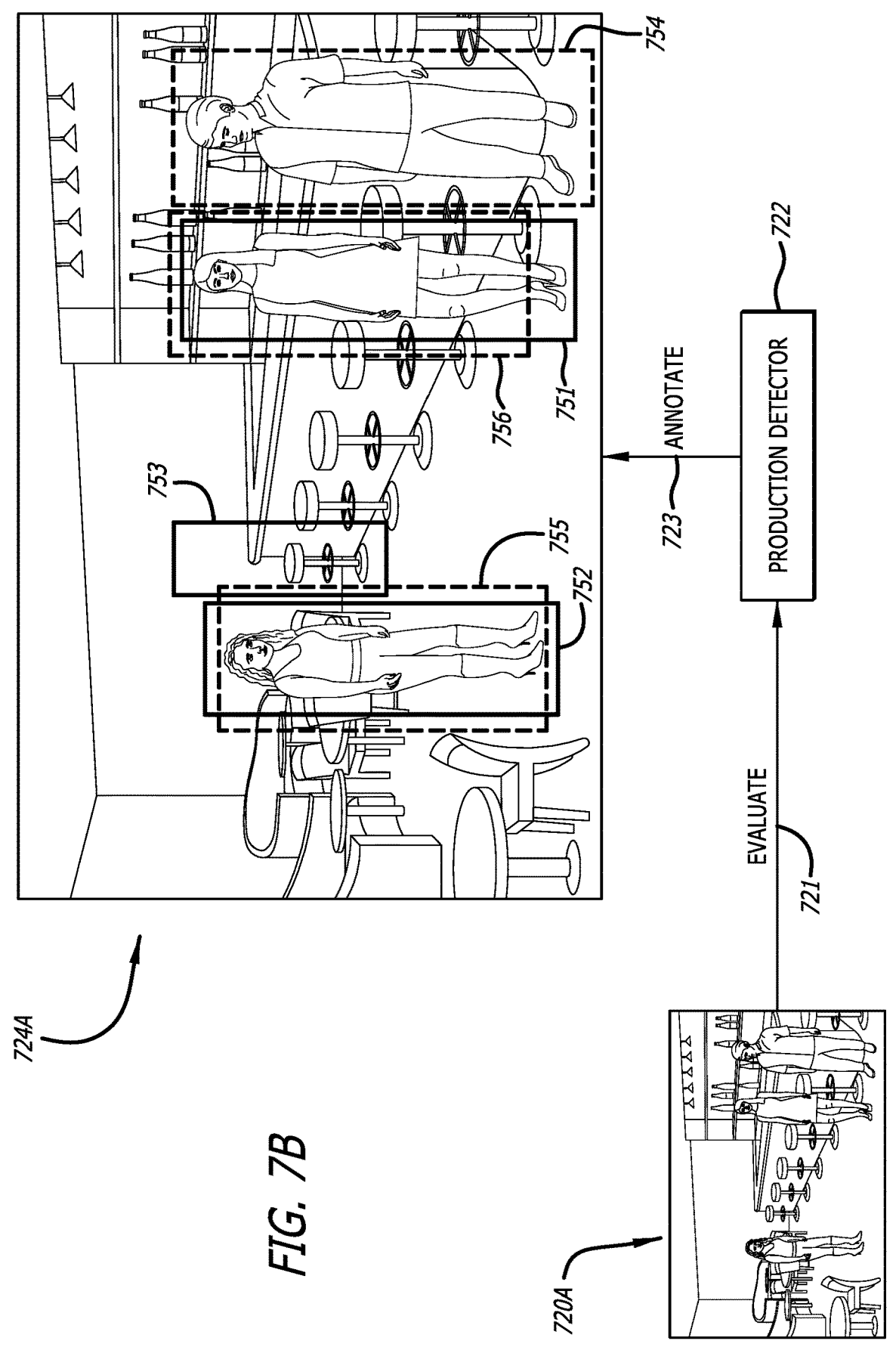
FIG. 7B is a conceptual diagram of annotating a frame for a surrogate data set in accordance with an embodiment of the disclosure.

Referring to FIG. 7B, a conceptual diagram of annotating a frame for a surrogate data set in accordance with an embodiment of the disclosure is shown. Exemplary frame 720A may be a frame taken from the validation data set 720. It is evaluated (arrow 721) by production detector 722. The outputs of production detector 722 are then annotated (arrow 723) and sent to surrogate data subset 724. Exemplary annotated frame 724A is taken from surrogate data set 724. The background image is the same in frames 720A and 724A. The differences lie in the annotations.

The rectangles in exemplary annotated frame 724A are bounding boxes 751 to 756—rectangular areas denoting the furthest horizontal and vertical extents of an object. Bounding boxes 751, 752, and 753 correspond to model predictions from production detector 722 that an object is present in exemplary annotated frame 724A in each of those locations. Bounding boxes 754, 755, and 756 correspond to annotations (arrow 723) indicating locations where an object is actually present (sometimes called the "ground truth"). Bounding boxes 751 and 756 substantially overlap, indicating that the model correctly predicted an object at that location. Similarly, bounding boxes 752 and 755 substantially overlap, indicating that the model also correctly predicted an object at that location.

Bounding box 753 represents a false positive error—a location where the model predicts the presence of an object, but no object is present. Bounding box 754 represents a false negative error—a location where the model failed to predict an object but where an object is present. Exemplary annotated frame 724A is grouped with other annotated frames into surrogate data set 724. Surrogate data set 724 is then used to train (arrow 725) filter 732 to look for hard cases to include in field data subset 734.

Referring to FIG. 8, a flowchart of a process 800 for collecting data and retraining a model in accordance with an embodiment of the disclosure is shown. Process 800 may begin by evaluating a validation data set using the current version of a production detector (block 810). The validation data set may be continuously updated from cameras deployed with customer's installations. The production detector may be continuously monitored to assess changes in the confidence score F-1 due to drift over time.

The output of the production detector may be annotated to generate a surrogate data set (block 820). The annotation process may be done either manually or automatically. The surrogate data set may contain frames from the validation data set, but the labeling for each frame may be changed by the annotation process to reflect the correctness of the predictions. In particular, false positives and false negatives may be selected for in the generation of the surrogate data set.

The surrogate data set may be used to train a filter (block 830). The makeup of the surrogate data set may allow the filter to identify cases prone to error by the current version of the production detector. In some embodiments, these hard cases may occur when the confidence score is close to the cutoff point between true positives and false positives, while in alternate embodiments, these hard cases may occur close to the cutoff point between true negatives and false negatives.

An entire field data set may be run through the filter to generate a field data subset (block 840). Ideally, this should occur in each individual camera which may run its own locally stored field data set through the filter to generate the local portion of the field data subset. By performing this locally to the camera, very little data may need to be sent from the camera to the manufacturer's or service provider's computers or servers at any point of the process because the largest portion of the data used is the field data set, which remains in the camera. The field data subset may be substantially smaller than the entire field data set.

The field data subset may be run through the current version of the production detector to generate a final field data set (block 850). Ideally, this should occur in each individual camera which may run its own locally stored field data subset through the production detector to generate a locally stored portion of the final field data set. The final field data set may be collected from all the deployed cameras and may comprise high quality cases for addition to the validation data set (block 860).

If the confidence score F-1 of the current version has dropped below a minimum threshold value, retraining may be necessary. In such a case, the validation data set may be used to update the training data set (block 870). The updated training data set may be used to conventionally train a new detector model (block 880). The new detector model may be deployed to some or all of the installed camera base to become the new production detector (block 890).

Figure 9:
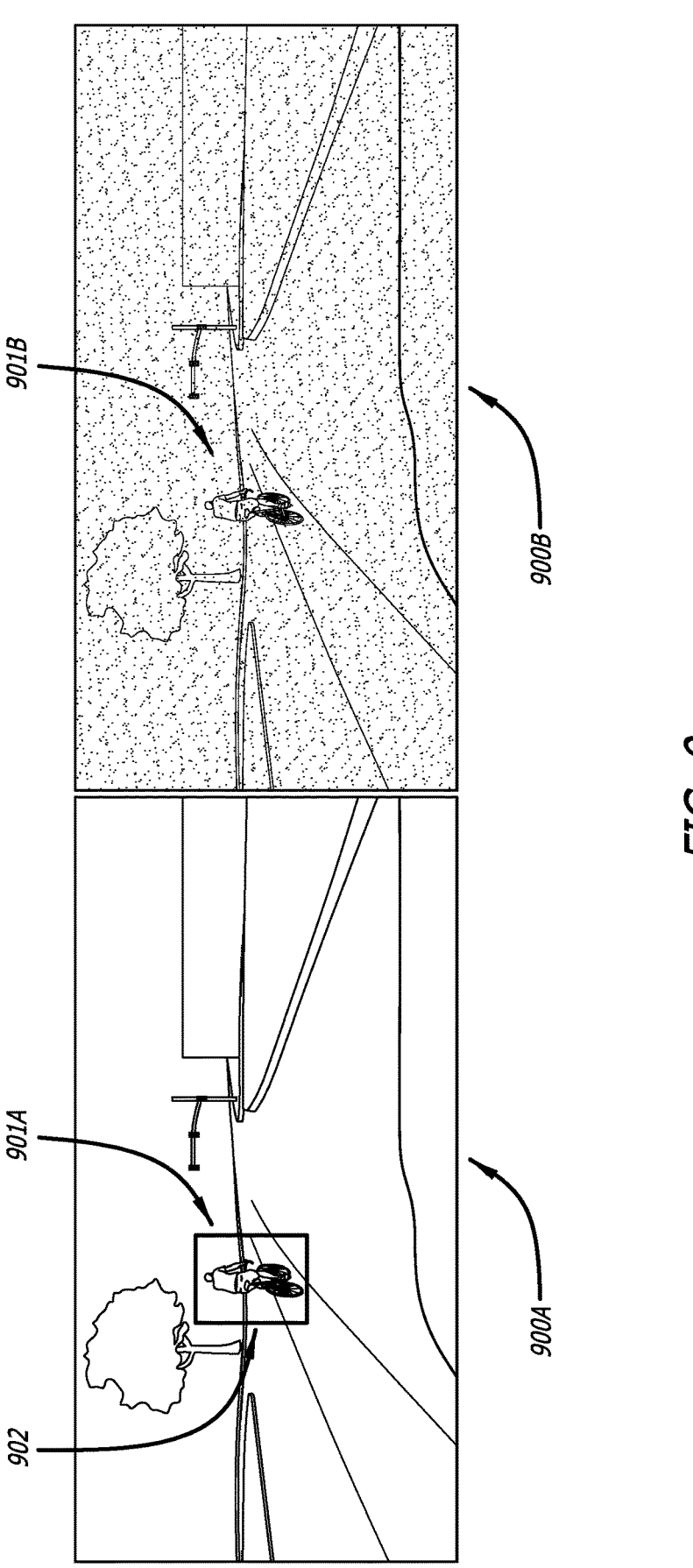
FIG. 9 is a comparison of two similar pictures illustrating the effects of picture quality on image recognition in accordance with an embodiment of the disclosure.

Referring to FIG. 9, a comparison of two similar pictures illustrating the effects of picture quality on image recognition in accordance with an embodiment of the disclosure is shown. Pictures 900A and 900B appear to have been taken at nearly the same moment from inside an automobile by two different cameras with different characteristics and/or settings. In both pictures, a bicyclist 901A and 901B (in pictures 900A and 900B, respectively) is seen riding away from the vantage point of the cameras.

Picture 900A is bright and clear, while picture 900B is darker with lower contrast. Bicyclist 901A is able to be recognized by an artificial intelligence (AI) object and/or feature recognition system processing the image (indicated by bounding box 902 surrounding bicyclist 900A), while bicyclist 901B is not recognized (indicated by the lack of a bounding box in picture 900B). This illustrates a very common occurrence in image processing video—an AI object and/or feature recognition system performance varies greatly depending on the location, time of day, season, camera image quality and/or resolution, and the like. It is highly desirable to be able to train AI systems to reliably overcome this problem. Ideally, such training would occur with little to no human intervention.

Figure 10:
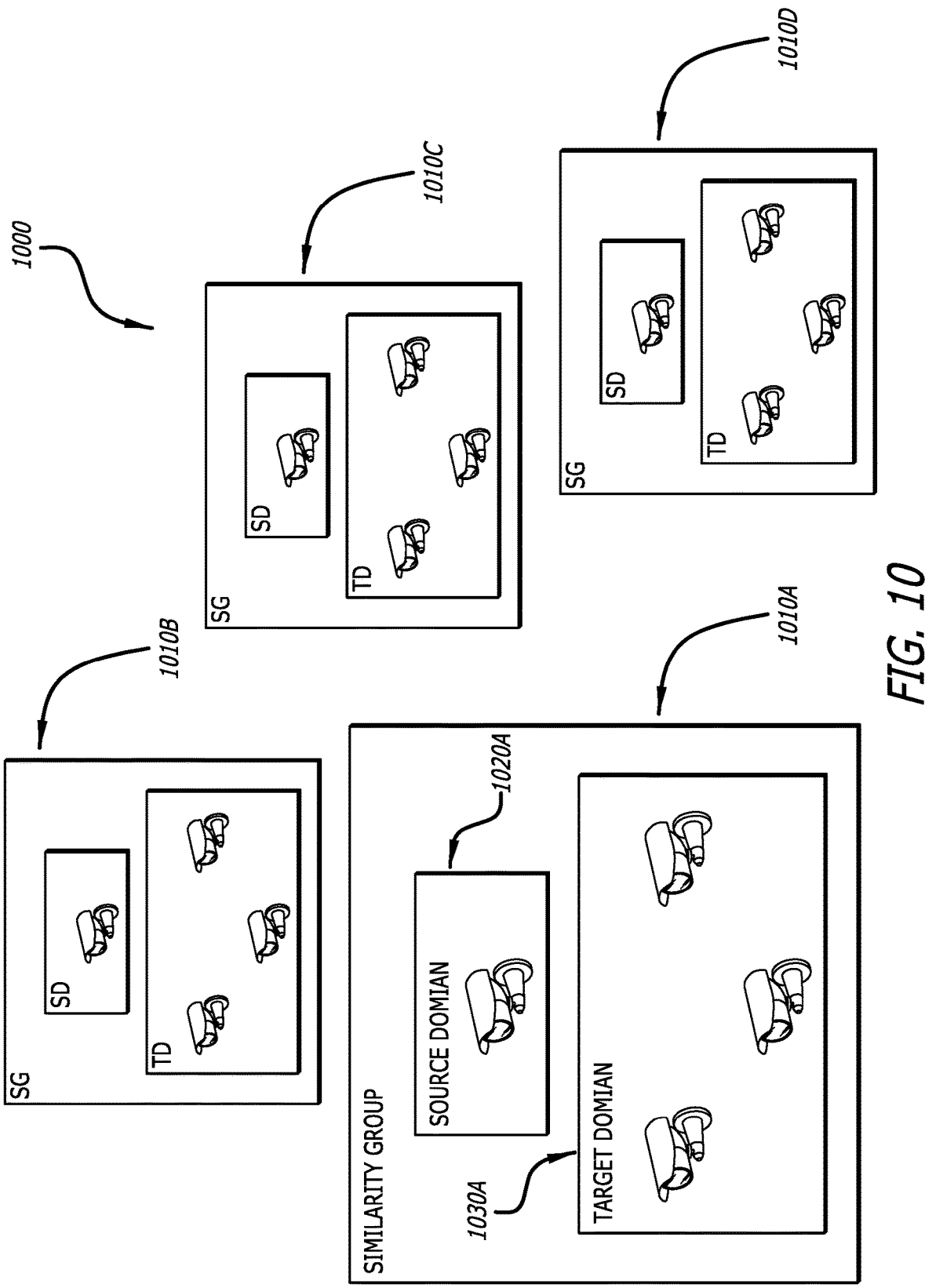
FIG. 10 is a conceptual block diagram of different groups of cameras in accordance with an embodiment of the disclosure.

Referring to FIG. 10, a conceptual block diagram of different groups of cameras in accordance with an embodiment of the disclosure is shown. The various cameras in a system of surveillance cameras 1000 may be placed in different locations. For training purposes, they may be divided into groups of cameras monitoring similar locations called similarity groups. Similarity group 1010A may, for example, be monitoring indoor locations such as a shopping mall, an airport terminal, office building lobbies, or the like; while similarity group 1010B may, for example, be monitoring outdoor parking lots; while similarity group 1010C may, for example, be monitoring automobile and/or pedestrian traffic on urban streets and/or intersections; while similarity group 1010D may, for example, be monitoring outdoor scenes like parks, school or college campuses, or the like. It is understood that there may be very many possible similarity groups that might be monitored, and the above examples are in no way limiting.

In some embodiments, a single video camera may be chosen as the source domain 1020A for similarity group 1010A. In other words, that camera may be selected as a representative for all of the cameras in similarity group 1010A. The remaining cameras in similarity group 1010A may be in target domains 1030A. In other embodiments, there may be multiple cameras in source domain 1020A, but training may start with only one camera and adding the others at later stages of training. The number of cameras is a design choice in any given embodiment.

The source domain 1020A camera may go through a similar process of training a filter (in this context called a "classifier") like filter 732 discussed in conjunction with FIG. 7A above. This may be a mostly automated process, though some human action may be required with the annotation process similar to the annotation (arrow 723) in FIG. 7A. Thus, it may be desirable to only go through the entire process with the single camera or cameras in source domain 1020A and use a fully automated process for the other cameras in the target domains 1030A.

Figure 11:
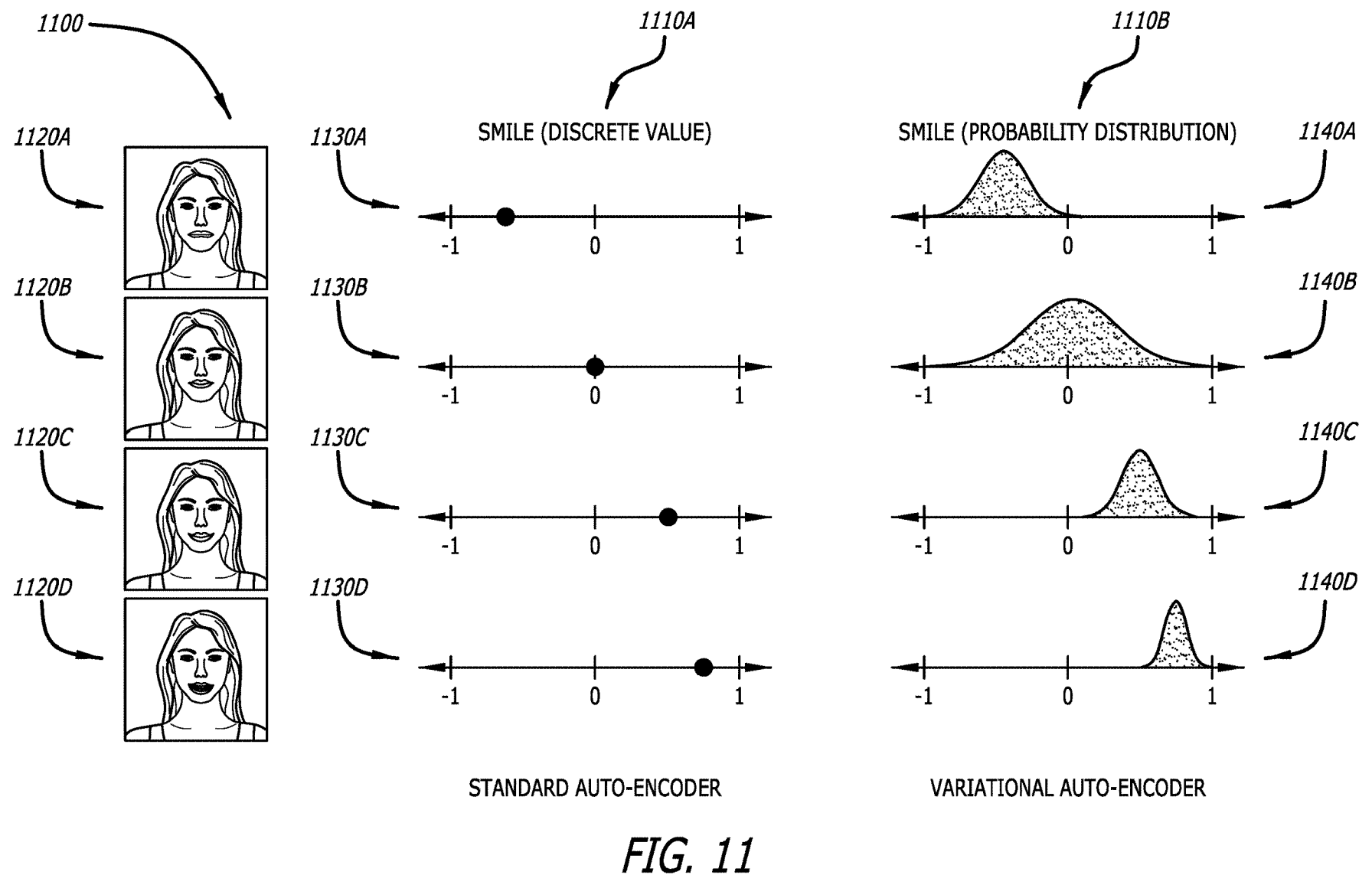

Referring to FIG. 11, a conceptual diagram of the latent space encoding of two sorts of auto-encoders in accordance with an embodiment of the disclosure is shown. For domain classification, it may be desirable to train an auto-encoder to generate hard examples for training future detectors like production detector 722 in FIG. 7A.

In general, there are two types of auto-encoding: standard auto-encoding (SAE) and variational auto-encoding (VAE). Conceptual diagram 1100 shows four images, 1120A, 1120B, 1120C, and 1120D, each showing a person having some degree of a "smile" on their face. Image 1120A shows a woman with a frown (a type of "not-smile"). Image 1120B shows a woman with an ambiguous smile. Image 1120C shows a woman smiling, while image 1120D shows a woman with an even fuller smile. Each image 1120A-D has two graphs representing the latent space encoding of SAE (graphs 1130A-D in column 1110A) and VAE (graphs 1140A-D in column 1110B) associated with it.

Column 1110A (including graphs 1130A-D) shows the encoding of the smiles using SAE, where each smile is given a discrete value in the range from −1 to 1. Positive values represent a degree of how "smile-like" a given image is, like, for example, images 1120C and 1120D. Negative values represent a degree of how "not-smile-like" a given image is like, for example, the graph 1130A associated with image 1120A of the woman frowning. Ambiguous results, like image 1120B, will be close to zero on the −1 to 1 scale, as shown in graph 1130B.

The second column of graphs 1110B (including graphs 1140A-D) shows the encoding of the smiles using VAE. Instead of discrete values, a probability distribution is given with its peak near the discrete value of the standard auto-encoding. The probability distributions also range from −1 to 1. Distributions near the edges tend to be relatively narrow because of the greater certainty with such cases, while more ambiguous cases nearer to zero are broader.

Each form of auto-encoding has its strengths and weaknesses. SAEs learn to generate compact representations and reconstruct their inputs well, but the latent space they encode their vectors to may not be continuous. This does not allow easy interpolation between two points of a latent dimension and is well suited for encoding input images but not suited for generation (see column 1110A). VAEs have a regularizing term where an image type spans a whole area so that areas corresponding to different images overlap. This makes image generation smooth with respect to latent space. Thus, VAE is well suited for generating new images different from input images but does not reconstruct input images as well as SAE (see column 1110B).

In machine learning, a latent space is an embedding of a set of items within a manifold. In mathematics, a manifold is a topological space that has the property that each object (or point) in the space is defined by a vector of latent variables, where each variable defines a dimension of the space. The local region for each item in the manifold resembles Euclidean space. Items that resemble each other more closely are positioned closer to one another in the latent space. In image processing, position within the latent space can be viewed as being defined by a set of latent variables that emerge from the resemblances from the images and objects. The closer the values of the latent variables of one item relative to another, the closer they are in the latent space. In other words, the more two objects are similar in their latent dimensions, the more similar the underlying objects are likely to be.

If the items in the latent space are images and the latent variables are properties of those images, then the distance between the two images in latent space may be a strong indicator of how similar they are with respect to human perceptions. This is true even if those "similarities" are things that human perceptions cannot easily understand. Making these sorts of connections is an area where machine learning excels.

To more accurately recognize objects and their features, it may be desirable to train an auto-encoder using images from multiple cameras taken from multiple domains (like the similarity groups 1010A-D of FIG. 10). This may or may not require human intervention and may only be done once at the beginning of the training process. Ideally, the images may need to be spread out through at least a whole day to eliminate the artifact of lighting bias during capture at a specific time of day. Ideally, the sample may be representative of the distribution of content (object type/size, occlusion rates), context (background, surrounding objects), and capture (light, weather, seasonality) conditions. Because of the discrete nature of this data and that the task is to discriminate between the similar and different types of images, objects, and/or features (and not generate new images), it may be desirable to train an auto-encoder of the SAE type.

Once the images from the assumed different domains are collected, the auto-encoder may be trained on these images. Then, a latent space sample may be generated for each camera. The auto-encoder may be run on each image to output a sample of latent space vectors. The distance between these latent space samples may be measured to verify if they are truly from different domains. In particular, the goal is to compute the distance not between two points or vectors but between two vector samples. A suitable metric to compute the distance between samples is the Mean Maximum Discrepancy (MMD), as shown in Equation 1.

$$MMD^2(p\|q)=E_{x,y\sim p}[k(x,y)]+E_{x,y\sim q}[k(x,y)]-2E_{x\sim p,y\sim q}[k(x,y)] \qquad \text{(Equation 1)}$$

Where:

E=Expectation k(x,y)=kernel operator (ideally a Radial Basis Function)

p=a first specific sample image q=a second specific sample image

A threshold may be defined by computing the MMD value of two samples from the same camera. Pairs of sample images where the MMD is greater than the threshold are considered to be part of different domains. In practice, the MMD values for samples in different domains will be an order of magnitude greater than the MMD values for sample images in the same domain.

Depending on the number of cameras and assumed domains count, the procedure may be done hierarchically by applying the method to each similarity group (like similarity groups 1010A-D in FIG. 10). Then one encoder can be trained for each subgroup (like source domain 1020A and each target domain in 1030A in FIG. 10). If multiple cameras belong to the same domain, a representative camera may be chosen for each group, and the measuring procedure may be run. Then the process may be iterated to include all of the cameras represented in each group, so all of the selected input images are properly classified into domains.

Figure 12A:
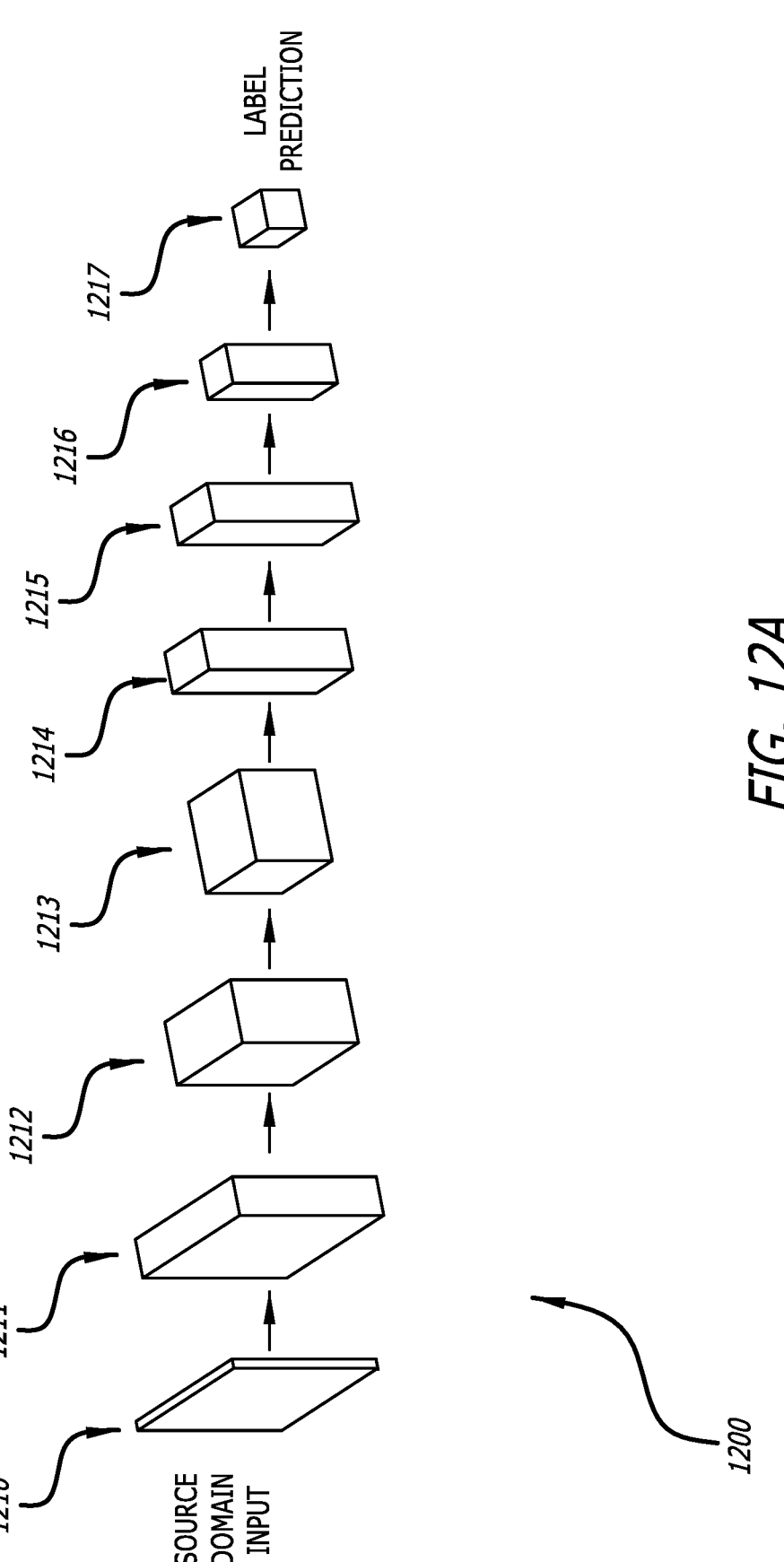
FIG. 12A is a conceptual block diagram of a source domain classifier in accordance with an embodiment of the disclosure.

Referring to FIG. 12A, a conceptual block diagram of a source domain classifier in accordance with an embodiment of the disclosure is shown. Source Domain Classifier (SDC) 1200 may comprise an artificial network of the sort described in conjunction with FIG. 2 and may take source domain input 1210 from the selected images from the source domain. SDC 1200 may have an input layer 1211, intermediate layers 1212 to 1216, and an output layer 1217. Although seven layers are shown in the figure, the number may vary from embodiment to embodiment, and any number be theoretically present as a matter of design choice. SDC 1200 may be trained on the source domain surrogate data set images (like surrogate data set 724 in FIG. 7A) until the output label predictions attain the required amount of accuracy for the application.

Figure 12B:
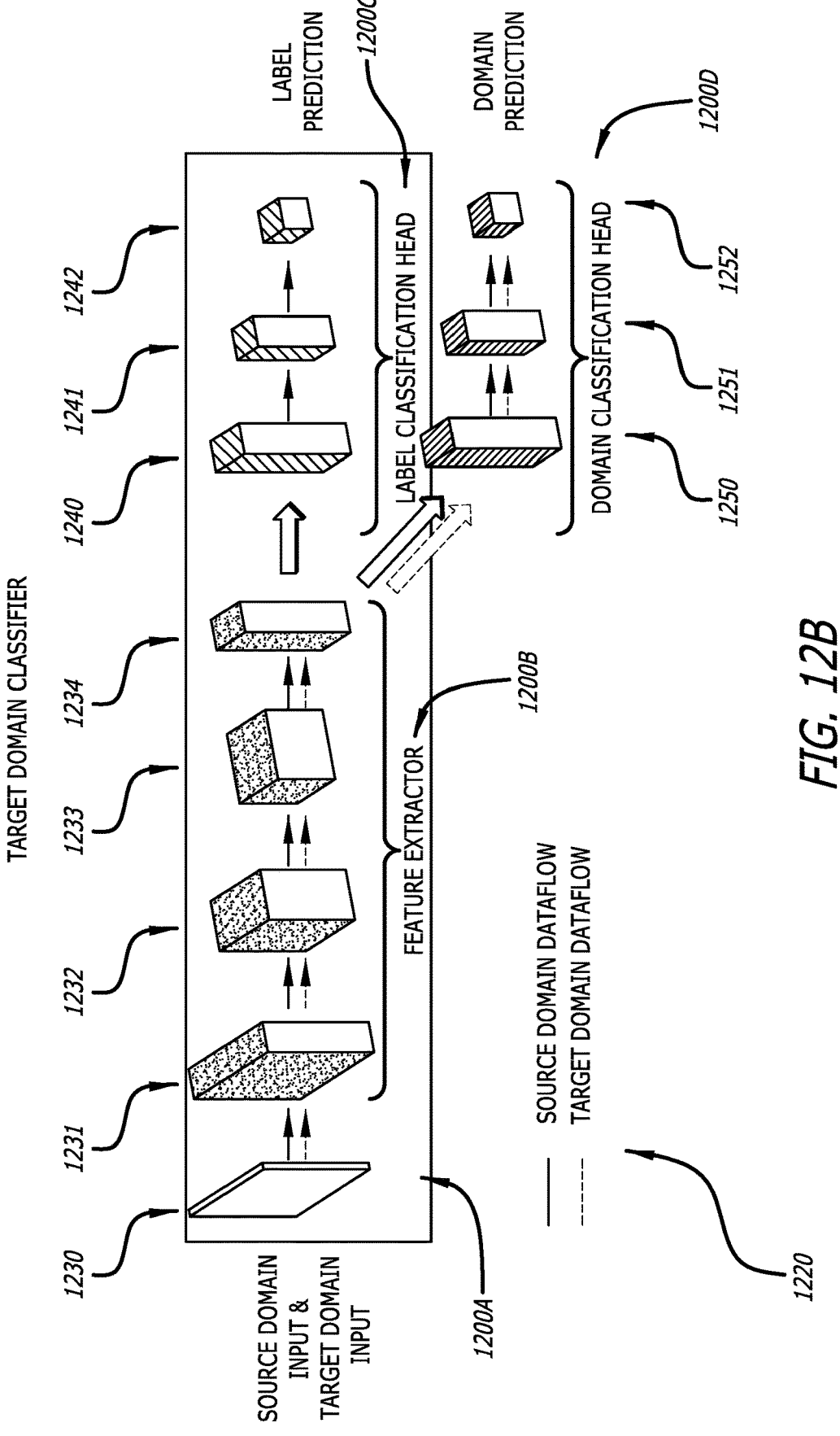
FIG. 12B is a conceptual block diagram of a target domain classifier in accordance with an embodiment of the disclosure.

Referring to FIG. 12B, a conceptual block diagram of a target domain classifier in accordance with an embodiment of the disclosure is shown. Prior to training, Target Domain Classifier (TDC) 1220 may begin its training as a copy of SDC 1200 from FIG. 12A (indicated in the box labeled 1200A in FIG. 12B). TDC 1220 may be partitioned into a feature extractor 1200B comprising layers 1231 to 1234 and a Label Classification Head (LCH) 1200C comprising layers 1240 to 1242. A Domain Classification Head (DCH) 1200D comprising layers 1250 to 1252 may be added, taking its input from the output of feature extractor 1200B. In some embodiments, initially, DCH 1200D may be identical to LCH 1200C, while in other embodiments, a different head may be used. It is understood that the number of layers in feature extractor 1200B, LCH 1200C, and DCH 1200D may vary from embodiment to embodiment as a matter of design choice.

During training, inputs 1230 may be taken from both the source domain and the target domain. The inputs 1230 from both domains are run through the feature extractor 1200B. The outputs from feature extractor 1200B for the source domain inputs 1230 may be sent to both the LCH 1200C and DCH 1200D, while the outputs from feature extractor 1200B for the target domain inputs 1230 may only be sent to the DCH 1200D.

Figure 12C:
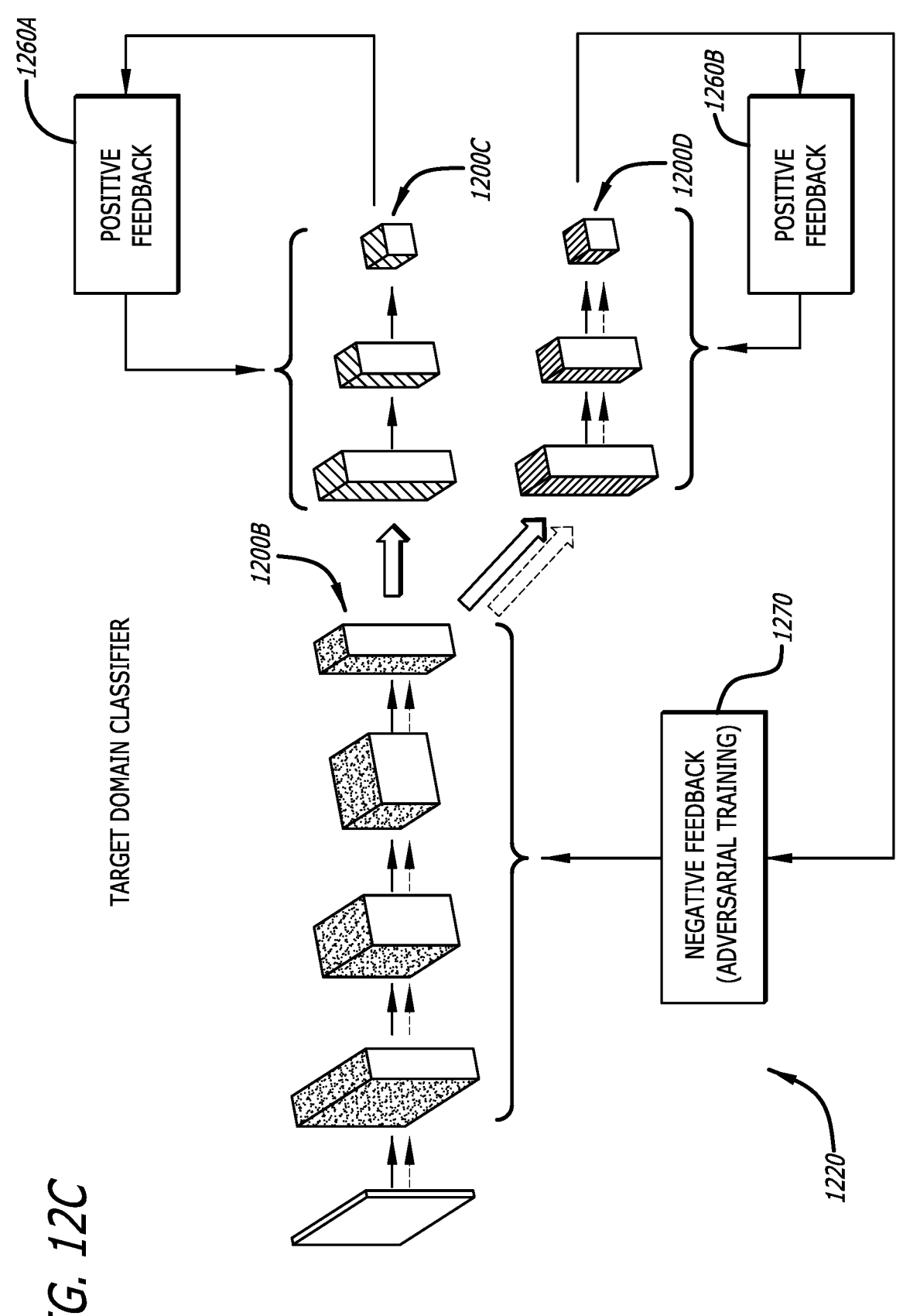
FIG. 12C is a conceptual block diagram of the training of a target domain classifier in accordance with an embodiment of the disclosure.

Referring to FIG. 12C, a conceptual block diagram of the training of a target domain classifier in accordance with an embodiment of the disclosure is shown. Training any artificial neural network may involve taking the output, comparing it to the known (or ground) truth, and positively feeding the results back to the various layers (also called backpropagation) so that the network can learn from its mistakes. In training TDC 1220, this function may be performed by the positive feedback blocks 1260A and 1260B feeding back the results of the loss functions from LCH 1200C and DCH 1200D, respectively, in a manner that may be similar to the original training of SDC 1200. This feedback is intended to reinforce the training of LCH 1200C and DCH 1200D. The feedback to the model layers in feature extractor 1200B may be handled using negative feedback. In training TDC 1220, this may be performed by the negative feedback block 1270 feeding the results back to the feature extractor 1200B so that the network may learn from its "mistakes" but in a different way. The positive feedback may be "positive" in the sense that it reinforces the accuracy of LCH 1200C and DCH 1200D, while the negative feedback may be "negative" in the sense that it attempts to "confuse" the domain classification head by reinforcing ambiguous results (e.g., probabilities near 0.5 instead of being clearly near 0 or clearly near 1). This combination may maintain the accuracy of the label classification head while filtering out the features unique to both domains so that the resulting classifier can accurately identify easy/hard examples on data from either domain.

Training TDC 1220 may change the weighting of the coefficients in all three parts of TDC 1220: feature extractor 1200B, LCH 1200C, and DCH 1200D. The training of LCH 1200C may proceed in a normal fashion attempting to minimize the differences between the output of LCH 1200C and the ground truth in the source domain inputs. This training of the simultaneous negative feedback of the output of DCH 1200D to the feature extractor 1200B in parallel with the positive feedback to the DCH 1200D is sometimes called a "minmax game" or adversarial training.

In other words, the negative feedback may cause the DCH 1200D to train to produce ambiguous results. Clear YES (probability close to 1) and clear NO (probability close to 0) may be highly desirable results from the output of LCH 1200C, while an ambiguous result of MAYBE (probability near 0.5) may be undesirable. The negative feedback causes the entire TDC 1220 to train for ambiguous results at the output of DCH 1200D, while the positive feedback causes the entire TDC 1220 to train for clear results at the output of LCH 1200C. Since the entire network attempts to optimize both feedback paths simultaneously, the result is that the LCH 1200C will eventually produce consistently correct results, but it will be able to do so regardless of whether the image being evaluated comes from the source domain inputs or the target domain inputs.

It should be noted that while the original generation of the original SDC 1200 may have required some manual human involvement in the annotation process, the adversarial training process described to generate the final TDC 1220 may not require any images in the target domain set to be annotated. This is because the differing conditions in the images are intrinsic to the entire image regardless of its source. Once the training is complete, the final feature extractor 1200B and label classification head 1200C taken together are a new, more effective classifier over the source domain and all of the target domains in the similarity group. This allows extraction of hard examples from all domains for validation data sets (like validation data set 720) for training future detectors (like production detector 722 in FIG. 7A).

Figure 13A:
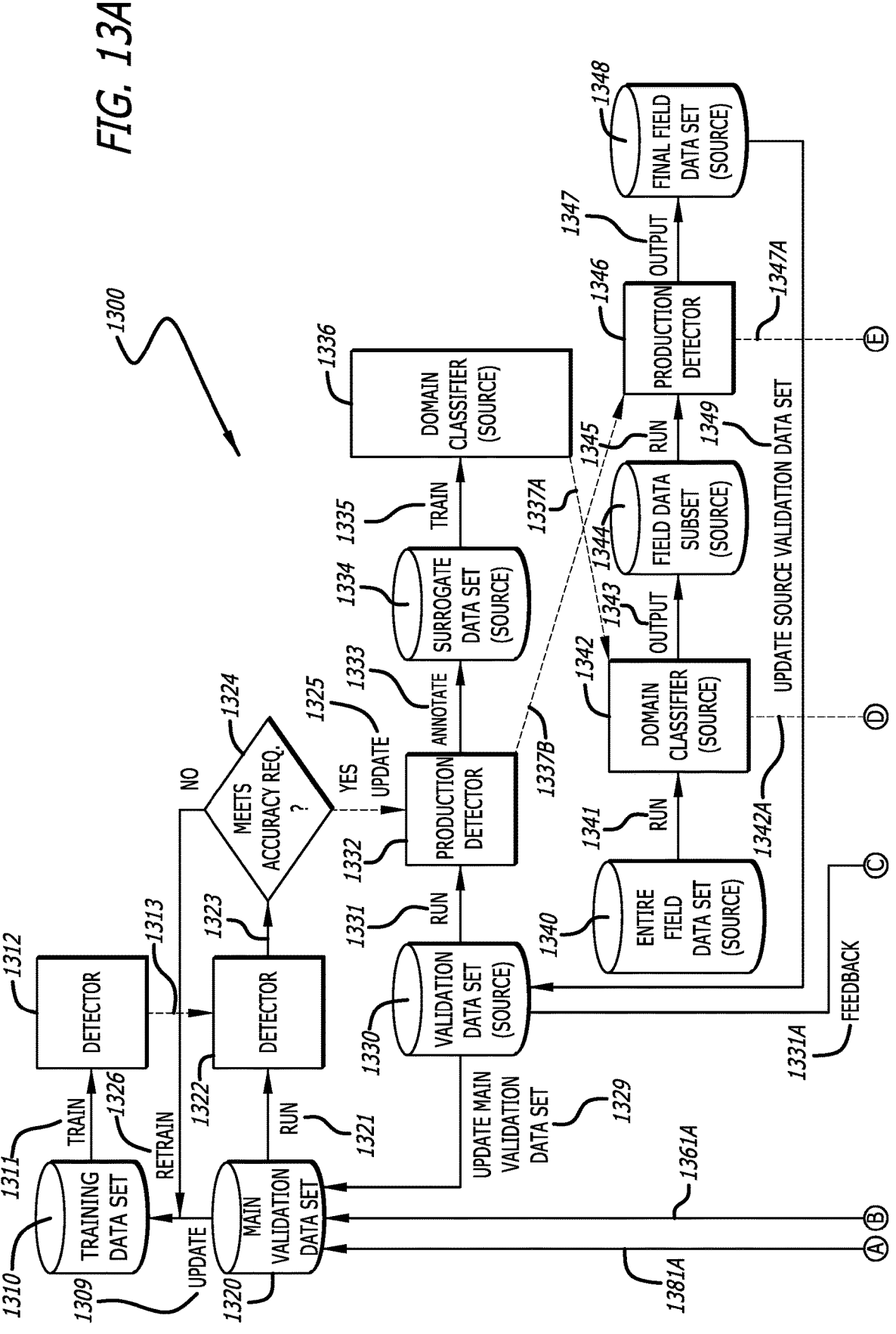
FIG. 13A is the first portion of a conceptual diagram of a video processing and storage computational system in accordance with an embodiment of the disclosure.

Referring to FIG. 13A, the first portion of a conceptual diagram of a video processing and storage computational system in accordance with an embodiment of the disclosure is shown. The operation of the portion of video processing and storage computational system 1300 in FIG. 13A is similar to the operation of computational system 700 discussed in conjunction with FIG. 7A above. The desired output is a trained and production-worthy detector model 1332 analogous to production detector 722. The primary difference is the starting, or source, validation data set 1330 is more limited, as it is a set of images from a source domain like the source domain 1020A of a similarity group like similarity group 1010A as discussed in conjunction with FIG. 10. This is attained by training a source domain classifier 1336, which is analogous to source domain classifier 1200 of FIG. 12A.

Figure 13B:
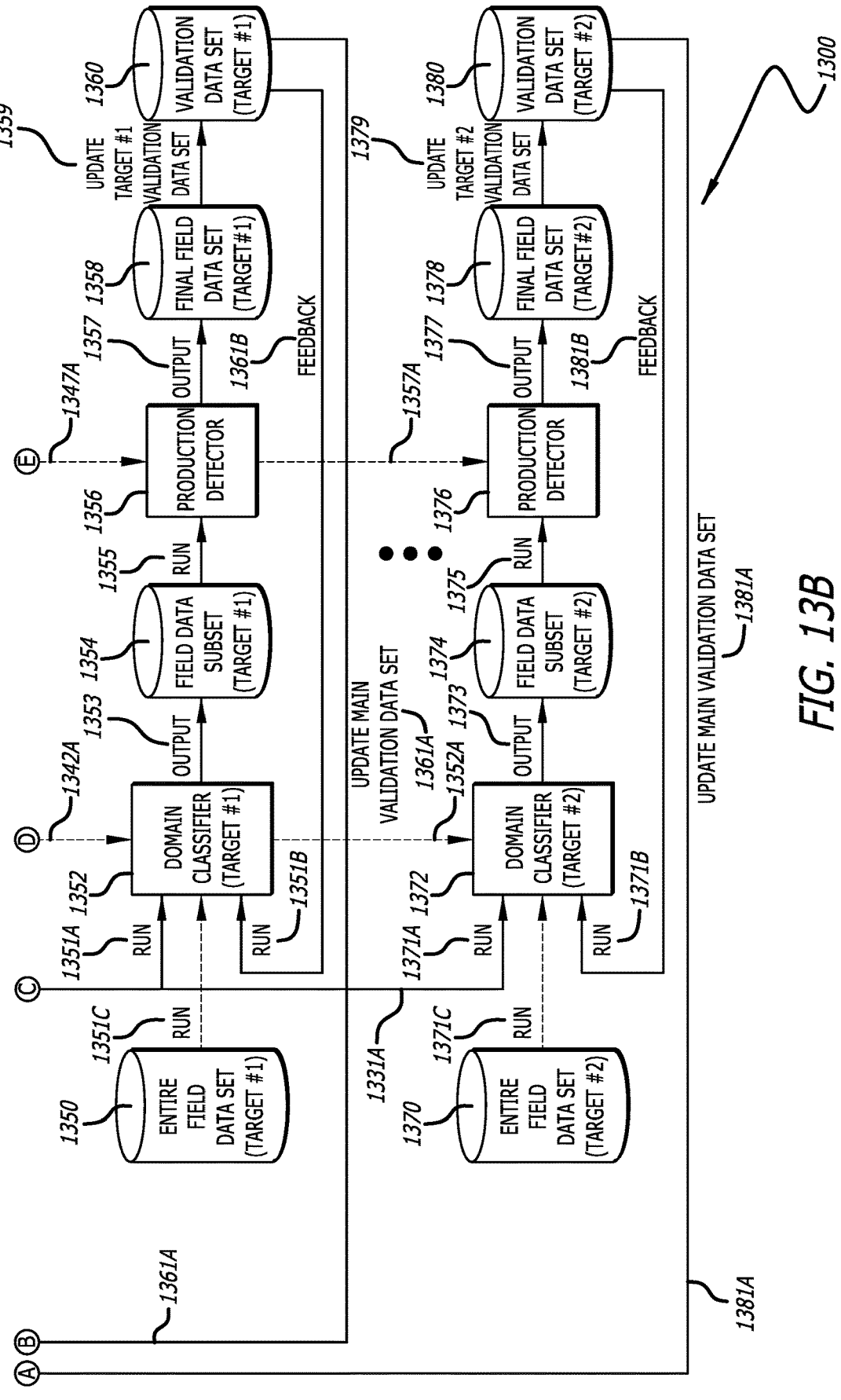
FIG. 13B is the second portion of a conceptual diagram of a video processing and storage computational system in accordance with an embodiment of the disclosure.

Referring to FIG. 13B, the second portion of a conceptual diagram of a video processing and storage computational system in accordance with an embodiment of the disclosure is shown. The operation of the portion of video processing and storage computational system 1300 in FIG. 13B may be analogous to the operation of the entire loop starting with field data set 730 and proceeding to filter for easy/hard examples 732, field data subset 734, production detector 736, and ending in final field data subset 740 in FIG. 7A. The primary difference may be that no annotation may be needed in the classifiers from the target domains, and only the source domain classifier may need the full training process of FIG. 7A.

Returning back to FIG. 13A, a training data set 1310 may be used to train (arrow 1311) a detector 1312, which may use a conventional machine learning process to generate an AI model. In some embodiments, this may be done on the camera manufacturer's computers or servers. In the first iteration of training (arrow 1311) detector 1312, the training data set 1310 may have no field data present. The initial training data set 1310 may have synthetic data obtained from one or more sources like, for example, data developed internally by the camera manufacturer, data purchased from a third party, open-source data, some combination thereof, etc. After initial deployment, video processing and storage computational system 1300 may add additional field data (arrow 1309) to training data set 1310 from main validation data set 1320.

Detector 1312 may be propagated (dashed arrow 1313) to become detector 1322. ("Propagated" in this context simply means used in a different part of the diagram. For example, production detector 1332 is the same production detector as 1346, 1356, and 1376 in the figure. This was done to make the diagram clearer to illustrate the inventive concept therein.) Main validation data set 1320 may be run through (arrow 1321) detector 1322. The results (arrow 1323) may be evaluated to determine if detector 1322 meets the accuracy requirements of the application (block 1324). If not, detector 1322 may be returned for retraining (arrow 1326). This next round of training may also make use of any updates (arrow 1309) from main validation data set 1320. This process may be repeated until the accuracy requirements are met (block 1324).

Once the accuracy requirements are met, detector 1322 may propagate/update (arrow 1325) and become the new production detector 1332. Source validation data set 1330 may be run (arrow 1331) through production detector 1332. The results are annotated (arrow 1333) to create surrogate data set 1334. The annotation may be done manually by humans, automatically by a much more powerful AI on a server or in the cloud, or by some other means. The surrogate data set 1334 may be used to train (arrow 1335) to source domain classifier 1336 (analogous to filter 732 in FIG. 7A), which may be propagated (arrow 1337A) to become source domain classifier 1342 (which is analogous to source domain classifier 1200 of FIG. 12A). The annotations in surrogate data set 1334 may customize the source domain classifier 1336 to specifically separate easy from hard examples. Similarly, production detector 1332 is propagated (arrow 1337B) to become production detector 1346.

The source domain entire field data set 1340 may be all of the data in one or more cameras in the source domain. It may be run through (arrow 1341) the source domain classifier 1342 to output (arrow 1343) source field data subset 1344, which may be run (arrow 1345) through the production detector 1346 to output (arrow 1347) the source final field data set 1348, which may be used to update (arrow 1349) source validation data set 1330 with additional hard examples for future training. Source validation data set 1330 may update (arrow 1329) main validation data set 1320.

The entire loop comprising source validation data set 1330, production detector 1332, source surrogate data set 1334, source domain classifier 1336, source domain entire field data set 1340, source domain classifier 1342, source field data subset 1344, production detector 1346, and source final field data set 1348 may be run as many times as is necessary to initially train source domain classifier 1342.

Referring again to FIG. 13 B, Source Domain Classifier (SDC) 1342 may be used to train target domain classifiers like Target Domain #1 Classifier (TD1C) 1352 for all the target domains in the same similarity group as the source domain. This training may be the type described in conjunction with FIG. 12A, FIG. 12B, and FIG. 12C above. SDC 1342 may be partitioned into a feature extractor (like feature extractor 1200B in FIG. 12B) and a label classification head (like LCH 1200C in FIG. 12B). SDC 1342 may be propagated (arrow 1342A), and a domain classification head (like DCH 1200D in FIG. 12B) may be added to form the initial TD1C 1352 (like TDC 1220 in FIG. 12B). The initial images in target domain #1 validation data set 1360 may not be annotated but rather chosen for diversity of viewing conditions as discussed in conjunction with FIG. 11 above. They may be fed back (arrow 1361B) to be run through (arrow 1351B) TD1C 1352 as many times as necessary using negative feedback as described in conjunction with FIG. 12C above. Source validation data set 1330 may also be fed back (arrow 1331A) and run through (arrow 1351A) TD1C 1352 as many times as necessary using positive feedback as described in conjunction with FIG. 12C above.

Once TD1C 1352 is trained, it may be used to generate more hard images in target domain #1 validation data set 1360. Target domain #1 entire field data set 1350 may be run through (arrow 1351C) TD1C 1352, and the output (arrow 1353) may generate target domain #1 field data subset 1354 which in turn may be run through (arrow 1355) production detector 1356 (propagated from production detector 1346 [arrow 1347A]). The output (arrow 1357) may generate target domain #1 final field data set 1358, which in turn may be used to update (arrow 1359) target domain #1 validation data set 1360.

Once trained, TD1C 1352 may be used to train the classifier for another domain. In theory, SDC 1342 could be used to train each of the target domains, but that would produce a plurality of classifiers that would only be improved relative to the source domain and one other domain. Thus, in a preferred embodiment, TD1C 1352 may be propagated (arrow 1532A) to become the initial Target Domain #2 Classifier (TD2C) 1372 for training.

This training may be the type described in conjunction with FIG. 12A, FIG. 12B, and FIG. 12C above. TD2C 1372 may already be partitioned into a feature extractor (like feature extractor 1200B in FIG. 12B), a label classification head (like LCH 1200C in FIG. 12B), and a domain classification head (like DCH 1200D in FIG. 12B). The initial images in target domain #2 validation data set 1380 may not be annotated but rather chosen for diversity of viewing conditions as discussed in conjunction with FIG. 11 above. They may be fed back (arrow 1381B) to be run through (arrow 1371B) TD2C 1372 as many times as necessary using negative feedback as described in conjunction with FIG. 12C above. Source validation data set 1330 may also be fed back (arrow 1331A) and run through (arrow 1371A) TD2C 1372 as many times as necessary using positive feedback as described in conjunction with FIG. 12C above.

Once TD2C 1372 is trained, it may be used to generate more hard images in target domain #2 validation data set 1380. Target domain #2 entire field data set (1370) may be run through (arrow 1371C) TD2C 1372. The output (arrow 1373) may generate target domain #2 field data subset 1374, which in turn may be run through (arrow 1375) production detector 1376 (propagated from production detector 1356). The output (arrow 1377) may generate target domain #2 final field data set 1378, which in turn may be used to update (arrow 1379) target domain #2 validation data set 1380.

If there are additional target domains to be trained, TD2C may be propagated to become the initial Target Domain #3 Classifier (TD3C—not shown). After training, TD3C may be propagated to become the initial Target Domain #4 Classifier (TD4C—not shown) if there is a fourth target domain, and so forth. After all of the target domain classifiers have been trained, the $N^{th}$ target domain classifier may be capable of the accuracy of SDC 1342 on source domain images but may also be as accurate on images from all of the domains in the similarity group. While there may be no need to label any images other than those in the source domain, only objects and features contained in the source domain images and recognizable by source domain classifier 1342 will be recognizable in the generation of easy/hard examples in the target domains. At appropriate times, the new images in source validation data set 1330, target domain #1 validation data set 1360, and target domain #2 source validation data set 1330 (and so on if applicable) will be used to update (arrows 1329, 1361A, and 1381A, respectively) the main validation data set 1320.

Persons skilled in the art will understand that not all of the details of the training of the various target domain classifiers (as described in detail in conjunction with FIG. 12A, FIG. 12B, and FIG. 12C) are shown in FIG. 13A and FIG. 13B to avoid overcomplicating the diagram.

Referring to FIG. 14A and FIG. 14B, a flowchart of a process 1400 for training a classifier in accordance with an embodiment of the disclosure is shown. Process 1400 may begin by training a new detector with a training data set (block 1410). The new detector may be evaluated with the main validation data set (block 1415) to determine if the new detector meets the necessary accuracy requirements (block 1420). If not, the new detector may be sent back for retraining (block 1425) and then may again be evaluated with the main validation data set (block 1415). If so, the new detector may replace the current production detector and become the new production detector (block 1430).

A source domain validation data set may be run through the new production detector (block 1435), and the results may be annotated to generate a source domain surrogate data set (block 1440). The annotation may be done manually, by a powerful AI engine, or the like. The source domain surrogate data set may be used to train a source domain classifier (block 1445). A source domain entire field data set may be run through the source domain classifier to generate a source domain field data subset (block 1450). The source domain field data subset may be run through the new production detector to generate a source domain final field data set (block 1455). The source domain validation data set may be updated from the source domain final field data set (block 1460).

A target domain classifier may be trained based upon the source domain classifier (block 1465) using the source domain validation data set and a target domain validation data set. The images in the latter may be taken from the target domain but may not be labeled. The source domain classifier may comprise a feature extractor portion and a label classification head. A domain classification head may be added to the source domain classifier to create a target domain classifier.

The source domain validation data set may be run through the feature extractor, the classification head, and the domain classification head. The target domain validation data set may be run through the feature extractor and only the domain classification head. The loss function output from the label classification head may be positively fed back to the input to reinforce the accuracy of the labels. The loss function output from the domain classifier may be negatively fed back to the input to "confuse" the domain classification head to produce ambiguous results. This may maintain the accuracy of the label classification head in a manner that may be independent of the domain of origin of the images being classified as easy/hard examples for further detector training.

Once trained, the target domain entire field data set may be run through the trained target domain classifier (and the output taken from the label classification head) to generate a target domain field data subset (block 1470) which may be run through the new production detector to generate a target domain final field data set (block 1475). The target domain validation data set may be updated by the target domain final field data set (block 1480). The main validation data set may be updated by the source domain final field data set (block 1485), and the main validation data set may be updated by the target domain final field data set (block 1490).

Referring to FIG. 15, a flowchart of a process 1500 for training a classifier in accordance with an embodiment of the disclosure is shown. Process 1500 may begin by training a source domain classifier using source domain data (block 1510). The trained source domain classifier may be partitioned into a feature extractor portion and a label classification head (block 1520). A domain classification head may be added to the source domain classifier to create a target domain classifier (block 1530). Training the target domain classifier may begin using the source domain data and target domain data (block 1540).

During the training, the source domain data passes through the feature extractor, the label classification head, and the domain classification head, while the target domain data passes through the feature extractor and the domain classification head, bypassing the label classification head. Positive feedback from the label classification head may be passed back to the input data to reinforce the accuracy of the labeling (block 1550). Negative feedback from the domain classification head may be passed back to the input data to "confuse" the domain classification head into reinforcing ambiguous results (block 1560). This may maintain the accuracy of the labeling of easy/hard examples while making it indifferent to the domain of origin of the input data. The training may be continued until the output of the label classifier head attains sufficient accuracy (block 1570).

Information as herein shown and described in detail is fully capable of attaining the presently described embodiments of the present disclosure and is, thus, representative of the subject matter that is broadly contemplated by the present disclosure. The scope of the present disclosure fully encompasses other embodiments that might become obvious to those skilled in the art and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
an artificial intelligence logic configured to:
    evaluate a source domain validation data set with a first detector,
    use annotations of an output of the first detector to generate a source domain surrogate data set,
    train a source domain classifier with the source domain surrogate data set,
    evaluate a source domain entire field data set with the source domain classifier to generate a source domain field data subset,
    evaluate the source domain field data subset with the first detector to generate a source domain final field data subset,
    update the source domain validation data set from the source domain final field data subset, and
    train, using the source domain classifier, a target domain classifier to:
        minimize an error function at an output of a label classification head of the target domain classifier, and
        maximize the error function at an output of a domain classification head of the target domain classifier to filter features that are unique to the source domain classifier.

2. The device of claim 1, wherein:
the target domain classifier comprises a feature extractor derived from a first portion of the source domain classifier;
the label classification head is derived from a second portion of the source domain classifier; and
the domain classification head is coupled in parallel to the label classification head.

3. The device of claim 2, wherein:
the artificial intelligence logic is further configured to:
    extract first features from the source domain validation data set using the feature extractor,
    extract second features from a target domain validation data set using the feature extractor,
    run the first features through both the label classification head and the domain classification head, and
    run the second features only through the domain classification head.

4. The device of claim 3, wherein:
the artificial intelligence logic is further configured to:
    apply positive feedback to the output of the label classification head, and
    apply negative feedback to the output of the domain classification head.

5. The device of claim 4, wherein the negative feedback is adversarial training.

6. The device of claim 4, wherein the positive feedback is backpropagation to reinforce features similar to the source domain classifier.

7. The device of claim 4, wherein:
the artificial intelligence logic is further configured to:
    train the target domain classifier to:
        label objects in images with substantially the same accuracy at the output of the label classification head with images from either the source domain validation data set or the target domain validation data set,
    update a main validation data set from the source domain validation data set,
    update the main validation data set from the target domain validation data set, and
    train a second detector using the updated main validation data set.

8. The device of claim 1, further comprising:
an optics module.

9. A system, comprising:
a computational system configured to:
    evaluate a source domain validation data set with a first detector,
    use annotation of an output of the first detector to generate a source domain surrogate data set, and
    train a source domain classifier with the source domain surrogate data set; and
a device, comprising:
    an artificial intelligence logic configured to:
        run a source domain entire field data set through the source domain classifier to generate a source domain field data subset,
        evaluate the source domain field data subset with the first detector to generate a source domain final field data subset,
        update the source domain validation data set from the source domain final field data subset, and
        train, using the source domain classifier, a target domain classifier to:
            minimize an error function at an output of a label classification head of the target domain classifier, and
            maximize the error function at an output of a domain classification head of the target domain classifier to filter features that are unique to the source domain classifier.

10. The system of claim 9, further comprising:
an optics module.

11. The system of claim 9, wherein:
the target domain classifier comprises a feature extractor derived from a first portion of the source domain classifier;
the label classification head is derived from a second portion of the source domain classifier; and
the domain classification head is coupled in parallel to the label classification head.

12. The system of claim 11, wherein:
the artificial intelligence logic is further configured to:
    extract first features from the source domain validation data set using the feature extractor,
    extract second features from a target domain validation data set using the feature extractor,
    run the first features through both the label classification head and the domain classification head, and
    run the second features only through the domain classification head.

13. The system of claim 12, wherein:
the artificial intelligence logic is further configured to:
    train the target domain classifier to:
        label objects in images with substantially the same accuracy at the output of the label classification head with images from either the source domain validation data set or the target domain validation data set, update a main validation data set from the source domain validation data set, update the main validation data set from the target domain validation data set, and train a second detector using the updated main validation data set.

14. The system of claim 12, wherein:

the artificial intelligence logic is further configured to:

apply positive feedback to the output of the label classification head, and apply negative feedback to the output of the domain classification head.

15. The system of claim 14, wherein the positive feedback is backpropagation to reinforce features similar to the source domain classifier.

16. The system of claim 14, wherein the negative feedback is adversarial training.

17. A system, comprising:

means for evaluating a source domain validation data set with a first detector;

means for using annotations of an output of the first detector to generate a source domain surrogate data set;

means for training a source domain classifier with the source domain surrogate data set;

means for running a source domain entire field data set through the source domain classifier to generate a source domain field data subset;

means for evaluating the source domain field data subset with the first detector to generate a source domain final field data subset;

means for updating the source domain validation data set from the source domain final field data subset; and means for training, using the source domain classifier, a target domain classifier to:

minimize an error function at an output of a label classification head of the target domain classifier, and maximize the error function at an output of a domain classification head of the target domain classifier to filter features that are unique to the source domain classifier, wherein;

the target domain classifier comprises a feature extractor derived from a first portion of the source domain classifier, the label classification head is derived from a second portion of the source domain classifier, and the domain classification head is coupled in parallel to the label classification head.

18. The system of claim 17, further comprising:

means for extracting first features from the source domain validation data set using the feature extractor;

means for extracting second features from a target domain validation data set using the feature extractor;

means for running the first features through both the label classification head and the domain classification head;

means for running the second features only through the domain classification head;

means for applying positive feedback to the output of the label classification head; and means for applying negative feedback to the output of the domain classification head.

19. The system of claim 18, further comprising:

means for updating a main validation data set from the source domain validation data set;

means for updating the main validation data set from the target domain validation data set; and means for training a second detector using the updated main validation data set.

20. The system of claim 18, further comprising:

a digital video camera.

* * * * *